Figure 1:
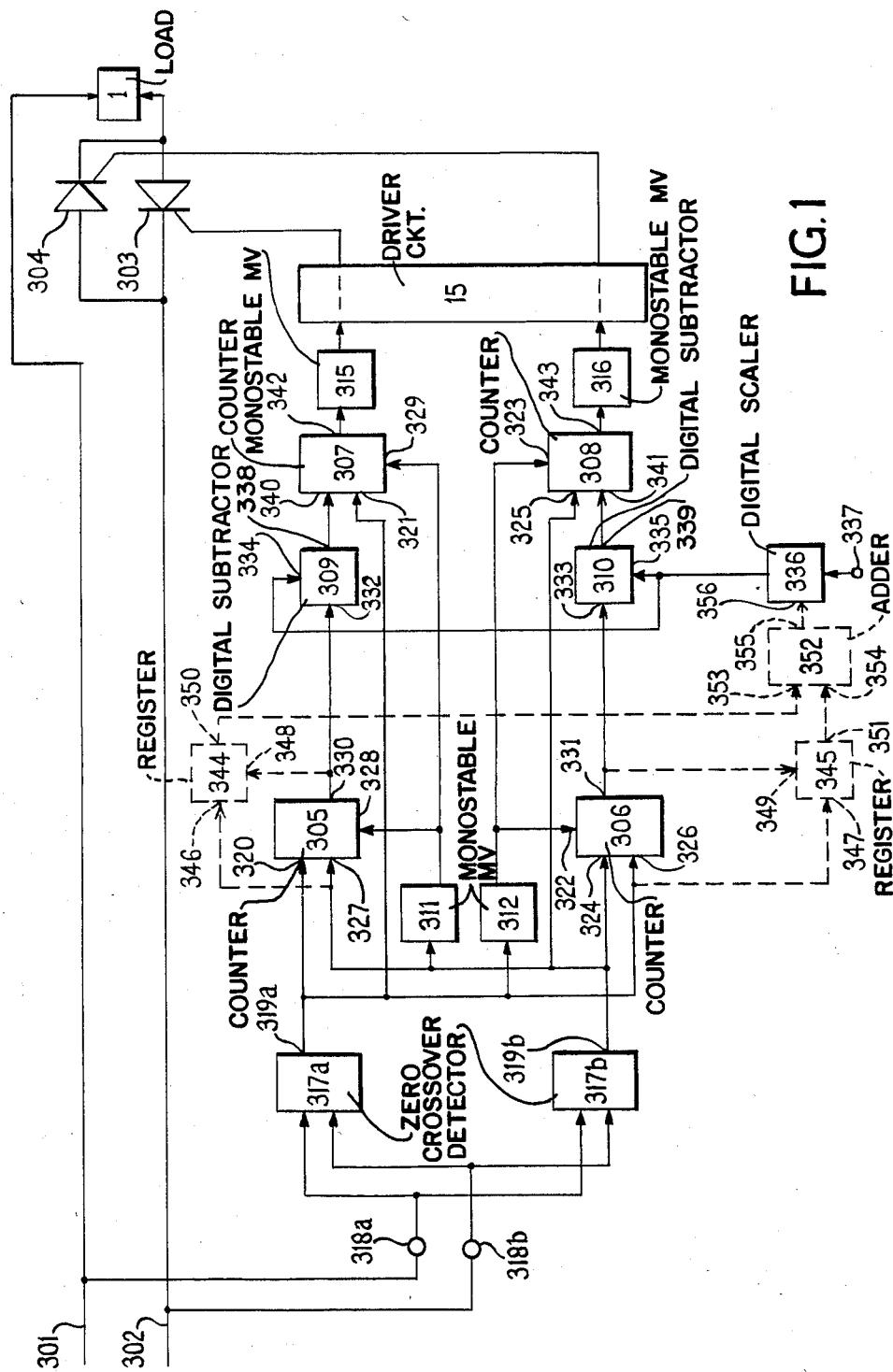

United States Patent [19]

Gilliam

[11] Patent Number: 4,586,121
[45] Date of Patent: Apr. 29, 1986

[54] CONTROL SIGNAL GENERATOR ARRANGEMENT FOR SEMICONDUCTOR SWITCHES

[75] Inventor: John E. Gilliam, Carshalton, England

[73] Assignee: U.S. Philips Corporation, New York, N.Y.

[21] Appl. No.: 448,666

[22] Filed: Dec. 10, 1982

[30] Foreign Application Priority Data

Dec. 18, 1981 [GB] United Kingdom ................ 8138175
Feb. 22, 1982 [GB] United Kingdom ................ 8205159

[51] Int. Cl.$^4$ .......................................... H02P 13/26
[52] U.S. Cl. ..................................... 363/87; 363/129
[58] Field of Search ................... 363/84, 87, 128, 129,
363/137, 138, 96, 85, 86; 318/341, 345 E, 803;
307/252 R, 252 N

[56] References Cited

U.S. PATENT DOCUMENTS

| | | | |
|---|---|---|---|
| 4,337,509 | 6/1982 | Omae et al. | 363/128 |
| 4,399,395 | 8/1983 | Espalage | 363/129 |
| 4,438,487 | 3/1984 | Kawai | 363/129 |
| 4,468,724 | 8/1984 | Omae et al. | 363/128 |
| 4,490,780 | 1/1984 | Nondahl | 363/129 |
| 4,499,534 | 2/1985 | Schnetzka et al. | 363/87 |

OTHER PUBLICATIONS

Alder, R. T. H. et al. Phase Locked Equidistant Pulse Generation Oct. 1980 IEEE Canadian Communications and Power Conference.
S. K. Tso and P. T. Ho, "Dedicated Microprocessor Scheme for Thyristor Phase Control of Multiphase Converters" IEE Proceedings, vol. 128, Pt. B, No. 2, Mar. 1981 pp. 101–108.
Guy Olivier, V. R. Stefanovic and Mohammed Akhtar Jamil, "Digitally Controlled Thyristor Current Source" IEEE Transactions on Industrial Electronics and Control Instrumentation, vol. IECI-26, No. 3, Aug. 1979 pp. 185–191.

Primary Examiner—Peter S. Wong
Assistant Examiner—Judson H. Jones
Attorney, Agent, or Firm—Robert T. Mayer; Bernard Franzblau

[57] ABSTRACT

Power delivered to a load by a three-phase supply is controlled by six thyristors which are controlled by a control signal generator comprising a programmed microcomputer (2), a zero-crossover detector (3), a clock pulse generator (6) and a counter (7) so that the thyristor conduction angles are determined by a digital signal applied to an input (17) of the microcomputer. In order to obtain a fast response to changes in the supply frequency and to take into account any unbalance between the supply phases, the microcomputer repeatedly measures the actual length of each nominally 60° portion of a complete period of the supply by starting the counter at a predetermined point within each portion, the counter subsequently being stopped by the output of the detector when the next zero-crossover occurs and then being read by the microcomputer. The microcomputer keeps a running record of the six results most recently obtained and generates the control signals at a predetermined time (determined by the signal at its input 17) prior to the instant at which each subsequent zero-crossover is expected to occur on the basis of when a zero-crossover has already occurred and the current content of the record.

13 Claims, 13 Drawing Figures

CONTROL SIGNAL GENERATOR ARRANGEMENT FOR SEMICONDUCTOR SWITCHES

This invention relates to a control signal generator arrangement for semiconductor switches for controlling power delivered to a load by an alternating current power supply source, said arrangement having inputs for connection to respective conductors of the supply, a further input for a signal at least nominally indicative of the time-fraction of each period of the total available supply waveform it is required be utilised for delivering power to the load, and outputs for feeding control inputs of said switches, said arrangement comprising means for detecting zero-crossing instants of the voltages between a pair or pairs of said conductors and generating control signals at said outputs in such manner that one is generated a predetermined period of time before a zero-crossing instant is expected to occur on the basis of the time at which a zero-crossing instant has already occurred, said predetermined period of time being proportional to the time-fraction currently indicated by a signal at the further input, a constant one-to-one relationship existing between the particular output at which each control signal is generated and the particular type of zero-crossing instant of each period of the supply with respect to the expected instant of occurrence of which the corresponding predetermined period of time is measured.

The invention also relates to a control arrangement for power delivered to a load by a three-phase alternating current supply, which control arrangement includes such a generator arrangement.

A known generator arrangement of the above kind is described in a paper by J. F. Gilliam and B. G. Starr in the Official Proceedings of the Second International Power Conversion Conference, Munich, 1980, the paper being entitled "A Universal Thyristor Trigger System based on Microprocessor Techniques".

A.C. power control by means of thyristors requires that they be triggered a predetermined time before each instant at which they become reverse-biased. Analog methods using resistor-capacitor timing are often satisfactory for producing the required trigger pulses when the power supply is single-phase, but in three-phase systems problems often arise with such methods in that it is difficult to keep the three-phase output balanced, with the result that, for example, a transformer or motor forming the load is liable to become magnetically saturated. The known arrangement referred to above was an attempt to overcome these difficulties by using digital techniques, more particularly by determining the relationship between the instants at which the control signals are generated and the instants at which the zero-crossovers of the input waveforms are expected to occur by means of an internal clock. The instants at which the zero-crossovers are expected to occur are also determined in the known arrangement by means of an internal clock, this being included in a phase-locked loop the phase-detector of which is also fed from the output of a zero-crossover detector. In order to obtain a good degree of noise-immunity the output of the zero-crossover detector is "windowed", i.e. pulses fed to the phase-detector therefrom are only accepted if they arrive at an instant which is close to that at which they are expected. If they arrive earlier or later than the window period the leading or trailing edge respectively of the window takes their place as far as the phase detector is concerned.

It has been found that the known arrangement has some undesirable properties. In particular (a) the time which the phase-locked loop takes to initially achieve synchronisation is quite long (due to the time constant it is necessary to incorporate in the loop) and (b) the loop can only follow rather small rates of change of the supply frequency (due to the presence of the window). Moreover, unbalance may still occur in the "on" periods of the various thyristors if the phases of the supply are themselves unbalanced (the latter causing the intervals between successive zero-crossovers to be of unequal length). It is an object of the invention to mitigate these disadvantages.

The invention provides a control signal generator arrangement for semiconductor switches for controlling the power delivered to a load by an alternating current power supply source, said arrangement having inputs for connection to respective conductors of the supply, a further input for a signal at least nominally indicative of the time-fraction of each period of the total available supply waveform it is required be utilised for delivering power to the load, and outputs for feeding control inputs of said switches, said arrangement comprising means for detecting zero-crossing instants of the voltages between a pair or pairs of said conductors and generating control signals at said outputs in such manner that each is generated a predetermined period of time before a zero-crossing instant is expected to occur on the basis of the time at which a zero-crossing instant has already occurred, said predetermined period of time being proportional to the time-fraction currently indicated by a signal at the further input, a constant one-to-one relationship existing between the particular output at which each control signal is generated and the particular type of zero-crossing instant of each period of the supply with respect to the expected instant of occurrence of which the corresponding predetermined period of time is measured, characterized in that said arrangement includes means for producing signals representative of the intervals elapsing between successively detected zero-crossing instants and for generating each of the control signals the predetermined period of time before the corresponding zero-crossing instant is expected to occur on the basis of time at which a zero-crossing instant has already occurred and the time which elapsed between the instants at which the zero-crossings of the same respective types occurred in the preceding period of the supply as represented by the corresponding signal or signals produced.

It has now been recognised that generating each of the control signals the predetermined period of time before the corresponding zero-crossing instant is expected to occur on the basis of the time at which a zero-crossing instant has already occurred and the time which elapsed between the instants at which the zero-crossings of the same respective types occurred in the preceding period of the supply as represented by the corresponding signal produced enables the generator arrangement to be quick to synchronise to the supply and, moreover, enables certain asymmetries in the supply to be taken into account when the instant at which each control signal is to be generated is calculated.

A particularly convenient way of ensuring that the required information is always available is to provide means for maintaining a running record of all those said signals representative of the intervals elapsing between successively detected zero-crossing instants which relate to a complete period of the supply and which have been most recently produced.

If the said predetermined period of time is proportional only to the time-fraction currently indicated at the further input an increase or decrease in the supply frequency will result in an increase or decrease in the power delivered to the load. While this may be acceptable if the generator is included in a control loop fed by the load, i.e. is controlled in response to an error signal, there are possible applications in which such a power variation would be unacceptable. In order to mitigate this disadvantage, if the above-mentioned running record is maintained, means may be provided for repeatedly summing the current content of the record and making said predetermined period of time also proportional to the current sum. This enables the predetermined period of time to be reduced as the frequency increases, and vice versa, thereby maintaining the power delivered to the load constant.

The use of a generator arrangement of the kind set forth to control power delivered to a load by a three-phase alternating current power supply source can be particularly advantageous as it enables any unbalance between the phases of such a supply to be taken into account when the instant at which each control signal is to be generated is calculated, thereby making it less likely that the load will be driven in an unbalanced manner. For use in such a context the arrangement may have first, second and third said inputs for connection to respective conductors of the supply, a fourth input which constitutes said further input, and first, second, third, fourth, fifth and sixth said outputs, and may comprise means for detecting each zero-crossing instant of the voltages between respective pairs of said first, second and third inputs, for generating said control signals at said outputs in cyclic succession in a manner such that one is generated said predetermined period of time before each said zero-crossing instant is expected to occur, for generating, when said time-fraction is less than 2/5, additional control signals at said outputs in said cyclic succession in a manner such that each such additional control signal is generated at the relevant output at an instant which coincides with the appearance of one of the first-mentioned control signals at the output which lies one place subsequently in said cyclic succession, for producing signals representative of the lengths of the intervals elapsing between successive said zero-crossing instants, and for maintaining in the aforesaid running record the six such signals most recently produced. If such an arrangement also includes the aforesaid means for repeatedly summing the current content of the record and making said predetermined period of time also proportional to the current sum, these means may be arranged to determine said predetermined period of time as the product of the sum of the intervals represented by the six signals currently in the record, the time-fraction currently indicated by a signal at the fourth input, and a factor of 5/12. If the record is present then, as a modification, each said signal representative of the length of the interval elapsing between successive said zero-crossing instants may be replaced by a signal representative of an increased or decreased version of the length, as indicated by the previous content of the record, of the interval which elapsed between the corresponding zero-crossing instants in the preceding period of the three-phase supply if the first-mentioned length should be respectively larger or smaller by a predetermined amount than the second-mentioned length, the increase or decrease being equal to said predetermined amount. Such a modification, in which "windowing" of the actual zero-crossing instants is effectively employed for the purpose of updating the record, can give considerably improved immunity to noise which may be present on the conductors of the supply, without reducing the rate of response of the arrangement to changes in the period of the supply to an unacceptable extent. If such replacement occurs several times in succession synchronism will have effectively been lost. In order that this should not result in the load being driven in an unacceptable manner, such a modified arrangement may include means for maintaining a count of the number of times such replacement has occurred reduced by the number of times such replacement has subsequently not occurred, and for terminating the generation of the control signals at said outputs if said count exceeds a predetermined amount.

If the semiconductor switches are thyristors (which turn off when they become reverse-biassed and remain so until they are subsequently re-triggered) it is strictly speaking only necessary that the control signals be present momentarily at each instant of their occurrence. However, in order that the triggering be reliable and/or that other forms of semiconductor switches (e.g. so-called gate-turn-off switches; GTOs) be usable, each control signal is preferably maintained each time for as long as the relevant semiconductor switch is required to continue to conduct. Accordingly, the arrangement may include means for maintaining, when said time-fraction currently indicated by a signal at the fourth input is less than 2/5, each of the first-mentioned control signals at the corresponding output until the current predetermined period of time has elapsed and for maintaining each of the additional control signals at the corresponding output while that one of the first-mentioned control signals which appears at the output which lies one place subsequently in said cyclic succession is maintained thereat, for maintaining, when said time-fraction currently indicated by a signal at the fourth input lies in the range 2/5 to 4/5, each of the first-mentioned control signals at the corresponding output until the current predetermined period of time, increased by the period of time which is expected to occur between the corresponding zero-crossing instant and the zero-crossing instant which will immediately succeed it as indicated by the current content of the record, has elapsed, and for maintaining, when said time-fraction currently indicated by a signal at the fourth input is greater than 4/5, each of the first-mentioned control signals at the corresponding output until the current predetermined period of time, increased by the period of time which is expected to occur between the corresponding zero-crossing instant and the zero-crossing instant which will immediately succeed it as indicated by the current content of the record and reduced by the product of the sum of the intervals represented by the six signals currently in the record, the amount by which said time-fraction exceeds 4/5, and a factor of 5/12, has elapsed.

It is an advantage from a cost point of view that as many of the required functions of the arrangement be carried out by a suitably programmed digital signal processing system, for example a suitably programmed microcomputer. However, if the arrangement is required to maintain the various control signals in the manner set forth above (which in many cases will be until the relevant zero-crossover is expected to occur) the problem arises that such processing systems are inherently serial devices which, inter alia, means that a single such system cannot both terminate a control pulse and "look" for the actual occurrence of the relevant zero crossover at the same time. In order to enable such a system to be used in such a context in spite of this, the arrangement may comprise a zero-crossing detector having said first, second and third inputs, a counter having a "stop" input to which an output of said detector is connected, a programmed digital signal processing system having said fourth input, said first, second, third, fourth, fifth and sixth outputs, a seventh output coupled to a "start" input of said counter, and a further input to which the "count" output of said counter is coupled, and a clock signal generator for feeding clock signals to said digital signal processing system and to said counter, said detector being constructed to generate a pulse at its said output when each zero-crossing instant of the voltages between respective pairs of said first, second and third inputs occurs and thereby stop said counter, said digital signal processing system being programmed to maintain said record, to start said counter a given time before each zero-crossing instant is expected to occur on the basis of the current content of the record and the instant at which the immediately preceding zero-crossing instant actually occurred, to read the count in said counter after each instant at which a zero-crossing is expected to occur to thereby determine the time relationship between the expected zero-crossing instant and the actual zero-crossing instant, to successively update the contents of the record in accordance with the corresponding relationships so determined, and to generate and terminate said control signals at said first, second, third, fourth, fifth and sixth outputs on the basis of the current content of the record, the instants at which the zero-crossovers actually occur, and the time fraction currently indicated by a signal at the fourth input.

In order that the record may be initially quickly loaded with reasonable approximations to the quantities actually required, and thereby minimise the start-up time of the arrangement, said detector may be switchable to a second state in which it generates a pulse only when each zero-crossing instant of a specific kind occurs between the voltages at said first, second and third inputs, the output of said detector may be coupled to a second further input of said digital signal processing system, and said digital signal processing system may be programmed to initially switch said detector to its second state, to then measure the period of time elapsing between successive output pulses of said detector, to load each part of the record with a signal representative of one sixth of the period so measured, and to subsequently switch said detector to its other state, commence updating of the record, and commence generation of said control signals.

Figure 2:
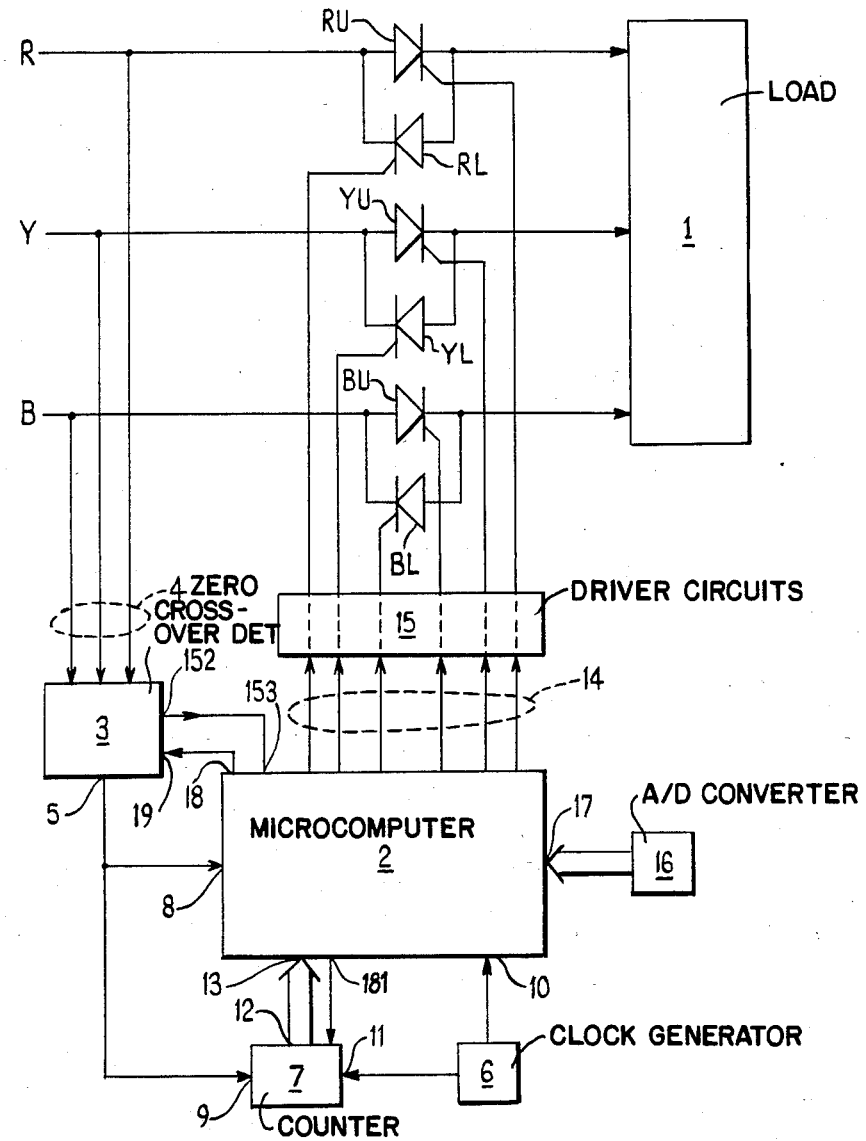
Figure 3:
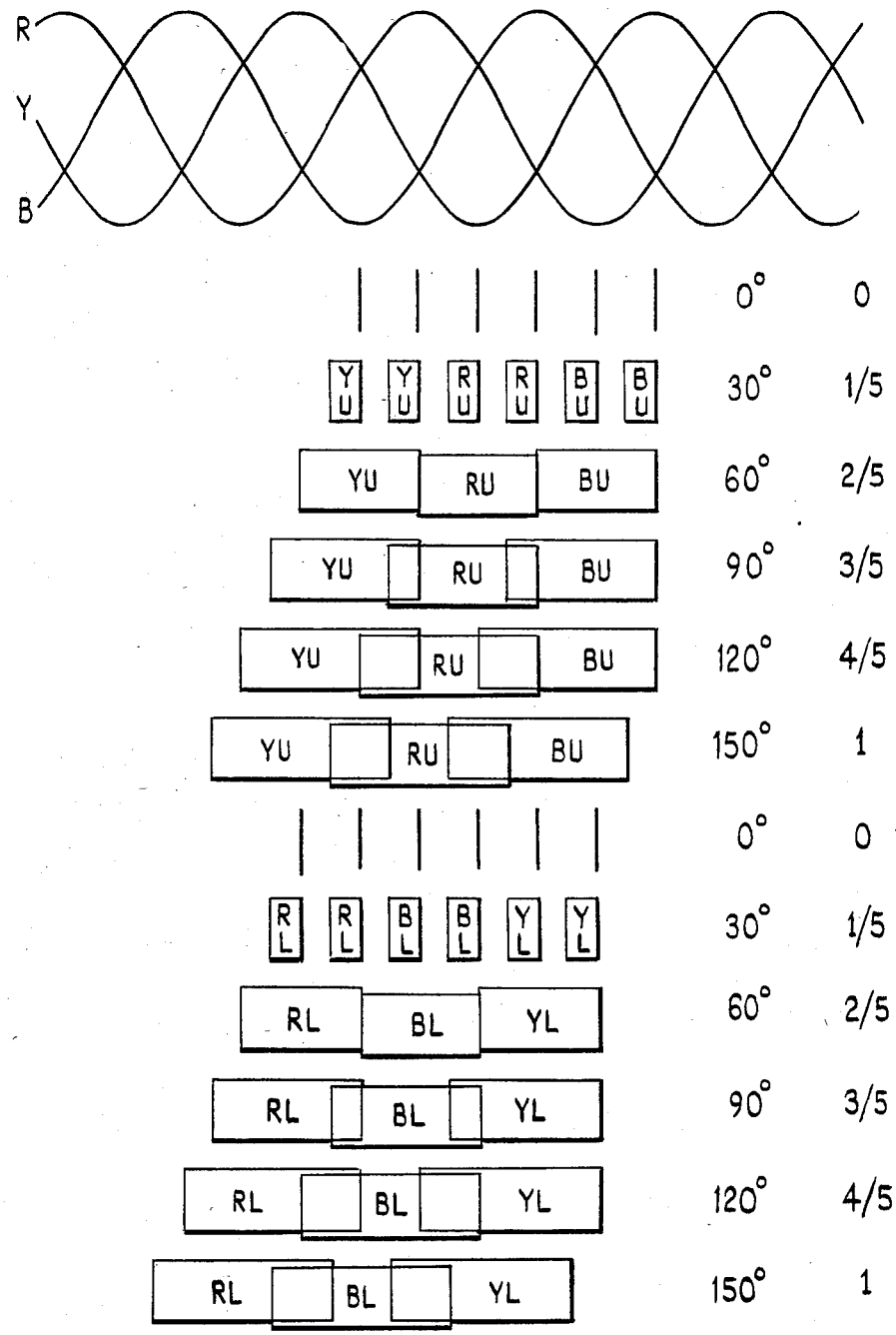
Figure 4:
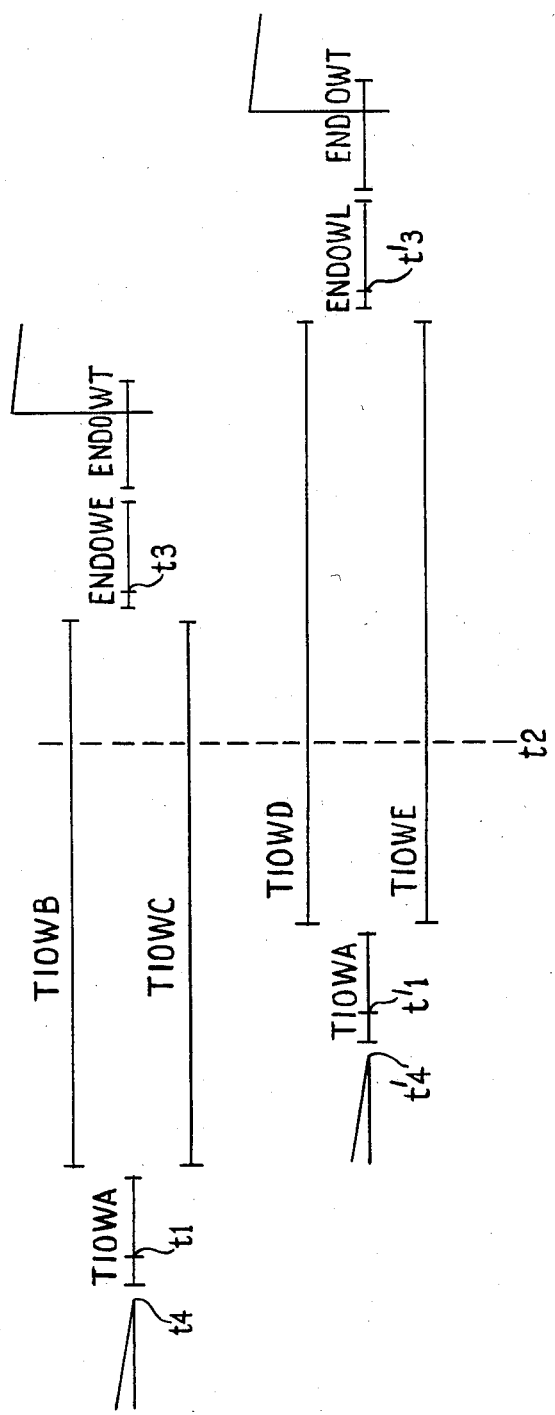
Figure 9:
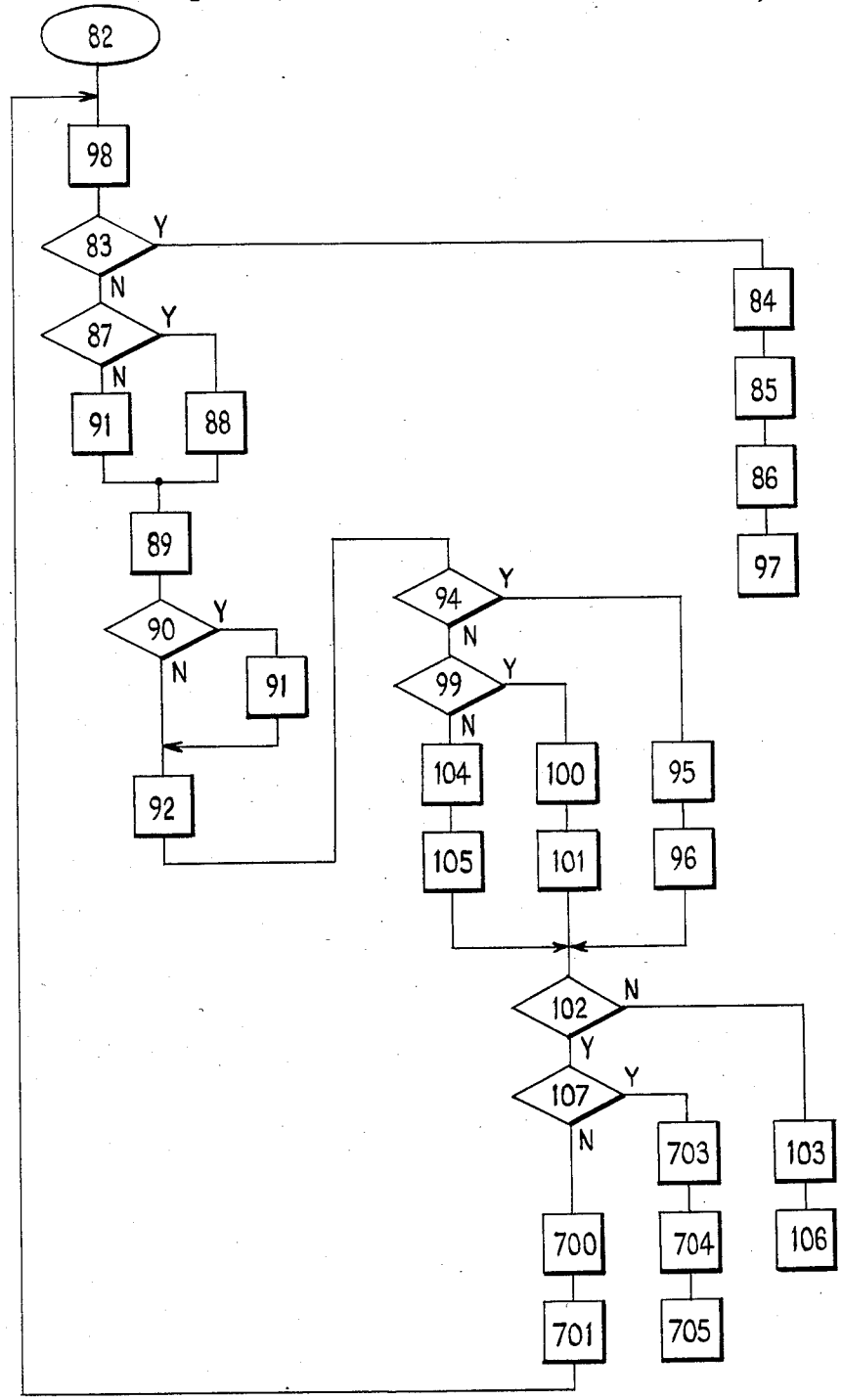
Figure 10:
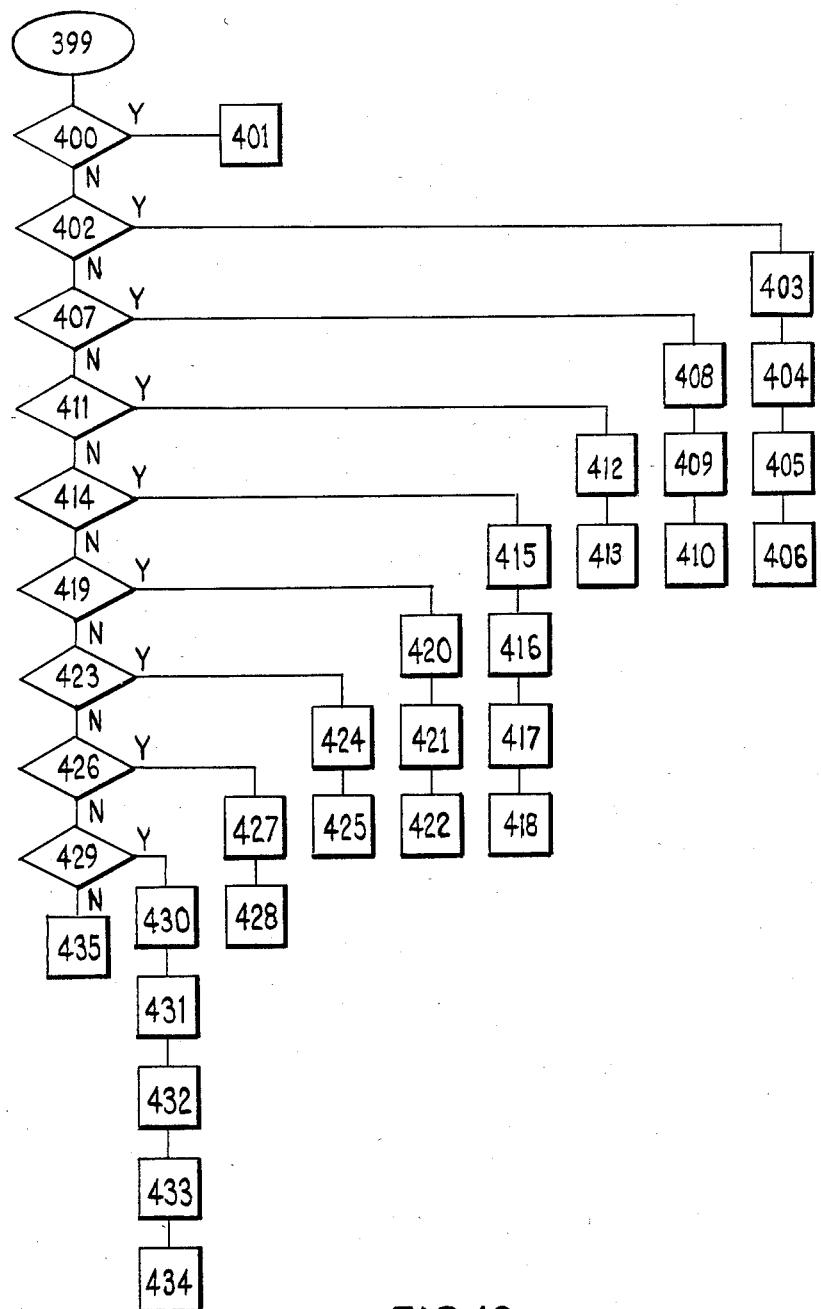
Figure 11:
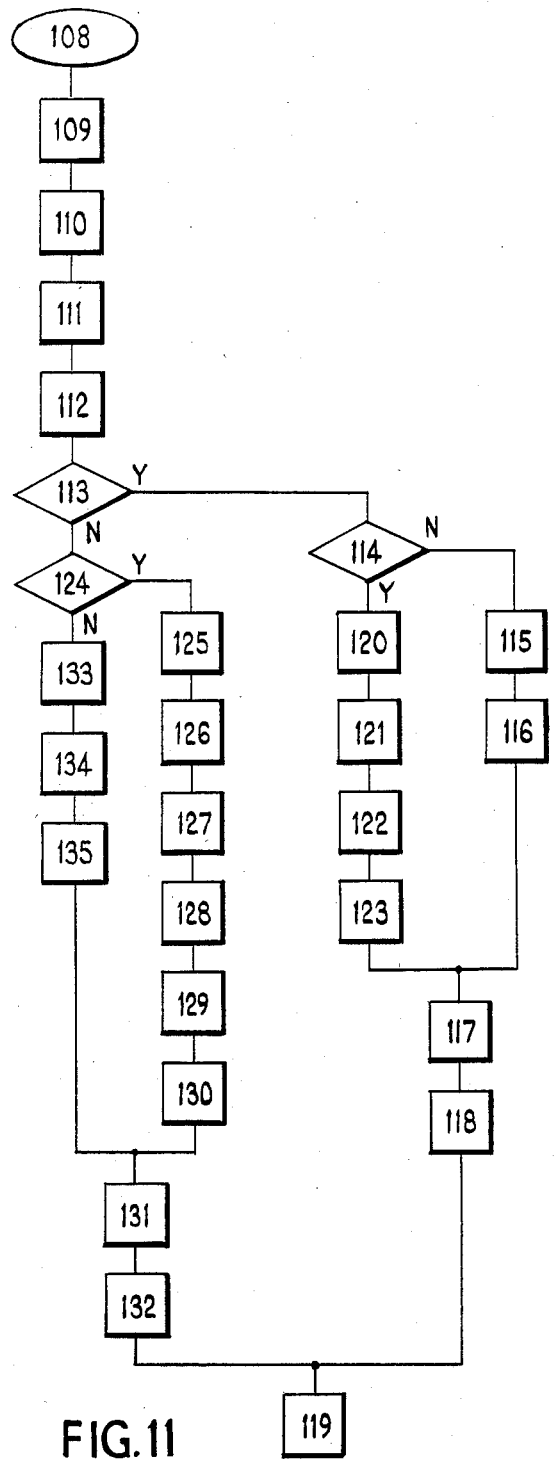
Figure 12:
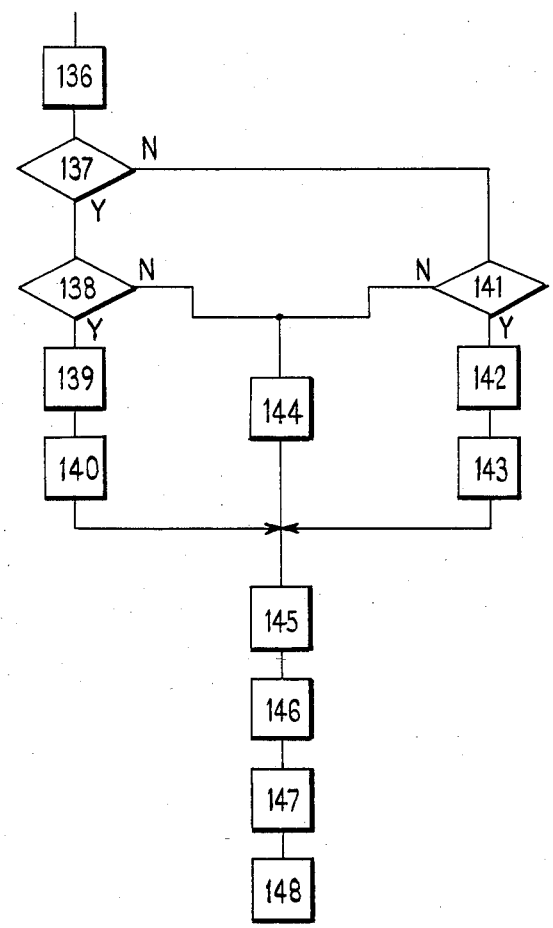
Figure 13:
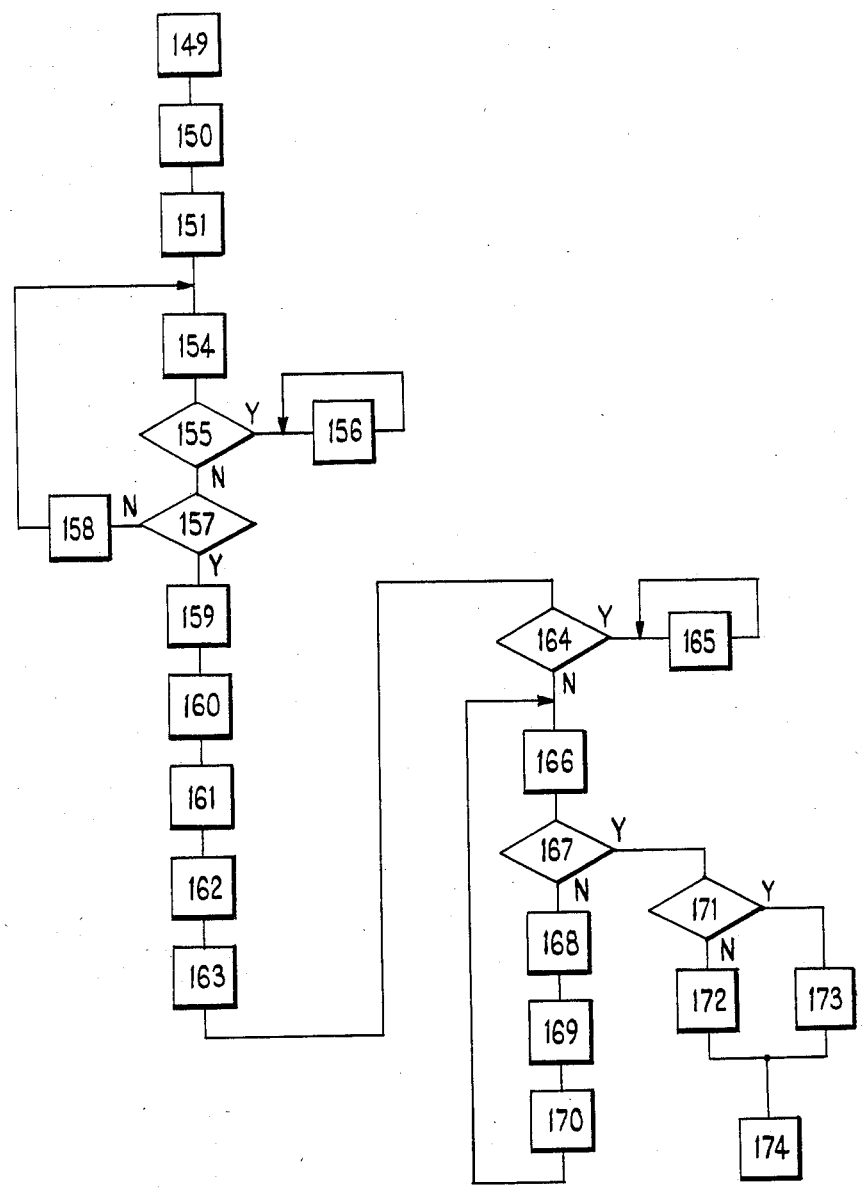

Embodiments of the invention will now be described, by way of example, with reference to the accompanying diagrammatic drawings, in which:

FIG. 1 is a diagram of a first embodiment in the form of a control arrangement for power delivered to a load by a single-phase alternating current supply, FIG. 2 is a diagram of a second embodiment in the form of a control arrangement for power delivered to a load by a three-phase alternating current supply, FIG. 3 illustrates semiconductor switch control signals which are generated in the arrangement of FIG. 2 under various conditions, FIG. 4 is a time diagram illustrating one aspect of the operation of a control signal generator arrangement included in the arrangement of FIG. 2, and FIG. 5, FIG. 6, FIG. 7, FIG. 8; FIG. 9; FIG. 10; FIG. 11; FIG. 12 and FIG. 13 are flow charts showing the operation of a programmed digital signal processing system included in the last mentioned control signal generator arrangement.

The control arrangement of FIG. 1 comprises a load 1 fed from the conductors 301 and 302 of a single phase power supply via a pair of power control semiconductor switches in the form of antiparallel-connected thyristors 303 and 304. The gates of the thyristors are fed with suitable control signals by a control signal generator arrangement comprising counters 305, 306, 307 and 308, digital subtractors 309 and 310 respectively, monostables 311, 312, 315 and 316 respectively, and a zero-crossover detector arrangement 317a, 317b. The detector arrangement 317a, 317b has a pair of inputs 318a and 318b which are fed from the conductors 301 and 302 respectively and generates a pulse at a first output 319a each time the voltage at input 318a becomes positive with respect to input 318b and generates a pulse at a second output 319b each time the voltage at input 318a becomes negative with respect to input 318b. The blocks 317a and 317b may contain, for example, suitably biassed diodes provided with load resistors, in known manner, the loads feeding the outputs 319a and 319b via limiting amplifiers, if required.

The output 319a is coupled to "start" inputs 320 and 321 of counters 305 and 307 respectively, to a "stop" input 326 of counter 306 and, via monostable 312 to a "reset" input 322 of counter 306 and a "load" input 323 of counter 308. Similarly, the output 319b is coupled to the "start" inputs 324 and 325 of counters 306 and 308 respectively, to a "stop" input 327 of counter 305 and, via monostable 311, to a "reset" input 328 of counter 305 and a "load" input 329 of counter 307. The data outputs 330 and 321 of counters 305 and 306 respectively are coupled to first inputs 332 and 333 of subtractors 309 and 310 respectively, the respective second inputs 334 and 335 of these subtractors being fed from the output of a digital scaler 336 having an input 337 which is fed with a signal at least nominally indicative of the time-fraction of each period of the total available supply waveform it is required be utilised for delivering power to the load 1. The outputs 338 and 339 of the subtractors 309 and 310 respectively feed the data inputs 340 and 341 of the counters 307 and 308 respectively. The "zero-count" outputs 342 and 343 of the counters 307 and 308 respectively feed the gates of the thyristors 303 and 304 respectively via the monostables 315 and 316 respectively (which are chosen to generate suitably short trigger pulses when activated) and respective driver circuits 15 which may each comprise a transistor the base of which is driven by the relevant monostable 315 or 316 and the collector circuit of which includes the primary of a transformer, the secondary of the transformer being connected between the gate and the cathode of the relevant thyristor 303 and 304. The arrangement also includes a clock signal generator (not shown) the output frequency of which is high relative to the frequency of the input supply waveform and the output of which is coupled to clock signal inputs of at least the counters 305–308. Assuming, for example, that the output pulses from the detector 317 are positive-going, the counters 305-308 are chosen to be positive-edge responsive at their start inputs 320, 321, 324 and 325 and their stop inputs 326 and 327, and negative-edge responsive at their reset inputs 322 and 328 and their load inputs 323 and 329.

The arrangement of FIG. 1 operates as follows. Each time the potential on conductor 301 goes positive with respect to conductor 302, i.e. when each positive half-cycle of the input waveform starts (and each negative half-cycle ends) the resulting pulse at output 319a of detector 317 starts counters 305 (which is arranged to then count up) and 307 (which is arranged to then count down) and stops counters 306 and 308. A short time after (monostables 311 and 312 are chosen to have an astable period which is short relative to a complete period of the input supply waveform) counter 308 is loaded from subtractor 310 with the content of counter 306 less the output of scaler 336 and counter 306 is reset. Similarly, each time the potential on conductor 301 goes negative with respect to conductor 302, i.e. when each negative half-cycle of the input waveform starts (and each positive half-cycle ends) the resulting pulse at output 319b of detector 317 starts counters 306 (which is arranged to then count up) and 308 (which is arranged to then count down) and stops counters 305 and 307. A short time after counter 307 is loaded from subtractor 309 with the content of counter 305 less the output of scaler 336 and counter 305 is reset. Thus at the end of each positive half-cycle the content of counter 305 is a measure of the duration thereof and counter 307 is loaded with this less the output of scaler 336. Similarly, at the end of each negative half-cycle the content of counter 306 is a measure of the duration thereof and counter 308 is loaded with this less the output of scaler 336. Scaler 336 is chosen so that, when the signal at its input 337 indicates "maximum power" (time-fraction of the input waveform it is required be utilised=1) its output is equal to just less than the maximum possible final contents of counters 305, 306 expected when the input waveform has, due to tolerances, its minimum frequency and maximum asymmetry. Thus, under these conditions, counters 307 and 308 will be loaded with a very small count and will reach zero subsequent to their being started at the beginning of the next positive and negative half-cycle respectively substantially immediately, resulting in conduction in the corresponding thyristors 303 and 304 for substantially the whole of the relevant half-cycles. Similarly, when the signal at input 337 of scaler 336 indicates "zero power" (time-fraction of the input waveform it is required be utilised=0) its output will be zero and counters 307 and 308 will be loaded with the final counts of counters 305 and 306 respectively. Thus, under these conditions, counters 307 and 308 will be loaded with counts such that, subsequent to their being started at the beginning of the next positive and negative half-cycle respectively, they will only reach zero and result in the generation of trigger pulses at the end of the relevant half-cycles (assuming that these have the same durations as the corresponding immediately preceding half-cycles) resulting in zero power being delivered to the load 1. Obviously, intermediate values of the signal at input 337 give rise to intermediate conduction periods in the thyristors 303 and 304.

It will be appreciated that the arrangement of FIG. 1 results in asymmetries in the input waveform being taken into account when determining the trigger instants of thyristors 303 and 304. Moreover, it is quick to respond to changes in these asymmetries and/or the frequency of the input waveform because each trigger instant is determined in terms of when the immediately preceding zero-crossing occurs and the length of the relevant half-cycle which is expected on the basis of what the length of the immediately preceding corresponding half-cycle actually was. However, as so far described, changes in the frequency of the input waveform will result in changes in the power delivered to the load because these will result in changes in the final counts of counters 305 and 306 whereas the output of scaler 336 is independent of such changes. In order to overcome this disadvantage the components shown in dashed lines may also be provided, these being registers 344 and 345 having "load" inputs 346 and 347 respectively, data inputs 348 and 349 respectively and data outputs 350 and 351 respectively, and an adder 352 the two inputs 353 and 354 of which are fed from the data outputs 350 and 351 respectively and the output 355 of which is coupled to a scale-factor input 356 of scaler 336 (which may be constructed as a multiplier). The load inputs 346 and 347 of registers 344 and 345 are fed from the detector outputs 319b and 319a respectively of detector 317, and their data inputs 348 and 349 are fed from the data outputs 330 and 331 of counters 305 and 306 respectively. Registers 344 and 345 are chosen to be positive-edge responsive at their load inputs 346 and 347. Thus, now, each time counters 305 and 306 are stopped, registers 344 and 345 are subsequently loaded with their respective contents so that registers 344 and 345 contain signals constituting a running record of the current lengths of the positive and negative half-cycles respectively of the supply. Adder 352 therefore produces a signal at its output 355 which is representative of the current length of a complete period of the supply waveform so that the output of scaler or multiplier 336 is constantly adjusted in accordance with changes in this period, resulting in the time-fraction of each complete period of the input waveform which is utilised for delivering power to the load becoming independent of such changes. If scaler 336 is formed by a simple multiplier obviously the signal applied to its input 337 should lie between zero (zero-power) and just less than one-half (substantially full power), assuming that the counters 305-308 are all clocked at the same rate. (It cannot be made equal to one-half because the outputs of subtractors 309 and 310 must never be allowed to fall below unity, even in the case of maximum difference between the lengths of the positive and negative half-cycles of the input waveform).

The control arrangement of FIG. 2 comprises a three-phase load 1 fed from the three phase-conductors R, Y and B of a three-phase power supply via six power control semiconductor switches in the form of thyristors RU, RL, YU, YL, BU and BL respectively which are connected in antiparallel in pairs. The gates of the thyristors are fed with suitable control signals by a control signal generator arrangement comprising a programmed digital signal processing system or microcomputer 2, a clock signal generator 6, a counter 7 (for example modulo-32) and a zero-crossover detector 3. The detector 3 has three inputs 4 which are fed from the phase conductors R, Y and B respectively and, in normal operation, generates a pulse at its output 5 each time the voltage between any two of its inputs 4 passes through zero, i.e. at each zero-crossing of the output of the three-phase supply. The detector output 5 is connected to the external interrupt input 8 of the microcomputer 2 (which may, for example, be a suitably mask-programmed version of the microcomputer type 8748 available from Messrs. Intel) and to the "stop" input 9 of the counter 7. The zero-crossover detector 3 may be, for example, as described and claimed in U.S. Pat. No. 4,495,461. The clock signal generator feeds the clock signal inputs 10 and 11 of the microcomputer 2 and the counter 7 respectively. The count signal output 12 of the counter 7 is connected to one port 13 of the microcomputer 2 and six conductors of another port 14 of the microcomputer 2 feed the trigger inputs of respective ones of the thyristors RU-BL via respective driver circuits 15. A generator 16 for a digital signal indicative of the time-fraction of each period of the total available three-phase waveform it is required be utilised for delivering power to the load 1 has its output connected to the bus 17 of the microcomputer 2. Generator 16 may be, for example, an analog-to-digital converter fed with an analog control signal from the exterior. A further output 18 of the microcomputer 2, for example an otherwise unused conductor of the port 14, is connected to a control input 19 of crossover detector 3. A further output 152 of the crossover detector 3 is connected to a further input, again for example an otherwise unused conductor of the port 14, of the microcomputer 2. A seventh output 181 of the microcomputer 2 is connected to a "start" input of the counter 7.

In operation the arrangement 2, 3, 6, 7 generates control or trigger signal blocks for the various thyristors with a time relationship to the three-phase input waveform as is illustrated for various cases in FIG. 3, the lengths and/or positions in time of the blocks being determined by the time-fraction indicated by the value of the digital signal applied to the bus 17 of the microcomputer 2 by the generator 16. The time-fractions corresponding to the various cases are shown on the right-hand side of the various groups of blocks. In principle each thyristor has to be triggered a predetermined period of time prior to when each of the two zero-crossings occurring in each 360° period of the supply at which it becomes reverse-biassed is expected, these periods corresponding to 30°, 60°, 90°, 120° and 150° portions of each 360° period for time-fractions indicated by generator 16 of 1/5, 2/5, 3/5, 4/5 and 1 respectively (and to intermediate values for intermediate values of time-fraction). However, for time-fractions of 2/5 or more the required trigger instant prior to the second of the two expected zero-crossings in fact occurs while the trigger block issued prior to the first of the two expected zero crossings is still present, i.e. for time-fractions of 2/5 or more the arrangement does not issue the second of each such pair of trigger blocks at all, but merely maintains the first trigger block until the second of the two zero-crossovers is expected to occur (rather than till the first of these two zero-crossovers is expected to occur) if the time-fraction lies in the range 2/5 to 4/5, and, if the time-fraction is greater than 4/5, maintains it until a time period before the second of these zero-crossings is expected to occur which is equal to the time period by which the start of the relevant trigger block precedes the trigger instant which would correspond to a time-fraction of 4/5. In other words, for time-fractions of greater than 4/5 the various blocks move forward in time but maintain the same length. In effect, therefore, the arrangement 2, 3, 6, 7 generates control or trigger signals at the outputs 14 in cyclic succession (outputs corresponding to thyristors YU, BL, RU, YL, BU, RL, YU . . . in the example illustrated) in such manner that one is generated a predetermined period of time before each zero-crossing is expected to occur, this predetermined time being proportional to the time-fraction currently indicated at the bus 17. Moreover, when the indicated time-fraction is less than 2/5, it generates additional control signals at the outputs 14 in the same cyclic succession in such manner that each such additional control signal is generated at the relevant output at an instant which coincides with the appearance of one of the first-mentioned control signals at that one of the outputs 14 which lies one place subsequently in the cyclic succession. Thus, for example, the second of the two YU blocks shown for a time-fraction of 1/5 coincides with the first of the two BL blocks show, etc. Each trigger signal block thus initiated terminates at an instant relative to the expected occurrence of a zero-crossover in the manner set forth above.

In order to generate the correct trigger signal blocks the arrangement 2, 3, 6, 7 basically operates as follows. It continuously measures the lengths of the intervals between the successive zero-crossovers (occurring nominally every 60°) in the input three-phase waveform. More particularly, the intervals between the successive output pulses of the detector 3 are measured in terms of the number of output pulses of the clock signal generator 6 then occurring. The results of these measurements are recorded in a six-location rotating stack in microcomputer 2, each new result being used to up-date, in the stack, the result obtained during the corresponding 60° interval in the immediately preceding complete period of the three-phase input waveform. Moreover, during each interval between successive output pulses from generator 3 the contents of the stack are summed to give the current length of a complete 360° period of the three-phase input waveform in terms of the number of output pulses of the clock generator 6 then occurring, and this length is multiplied by the product of the current output of generator 16 and a factor of 150°/360°=5/12 to give, in terms of a number of output pulses of clock generator 6, the aforesaid predetermined period of time currently required, i.e. the time before each expected zero-crossover at which one or more of the thyristors is required to be turned on. The result of this calculation is compared with the expected length of the next 60° interval of the three-phase supply as indicated by the current content of the location of the stack which corresponds to that interval, i.e. by the length which the corresponding interval had during the immediately preceding 360° period, to determine whether the trigger block to be issued during the next 60° period is of the kind which terminates at the end of that period, i.e. is to be directed to that thyristor the trigger time of which is directly related to the zero-crossover which will occur at the end of that period. (Such a block will be referred to as a "sector 1 block"). If this is found not to be the case, i.e. if the calculation result is larger than the relevant stored value, the calculation result is compared with the expected length of the combination of the next-but-one and next-but-two 60° intervals of the three-phase supply as indicated by the sum of the current contents of the locations of the stack corresponding thereto, i.e. by the sum of the lengths which the corresponding 60° intervals have most recently had, to determine whether the trigger block to be issued during the next 60° period is of the kind which terminates during the next-but-two 60° period, i.e. is to be directed to that thyristor the trigger time of which is directly related to the zero-crossover which will occur at the end of the next-but-two 60° period. (Such a block will be referred to as a "sector 3 block"). If this is found not to be the case, i.e. if the calculation result is less than the said sum, then the trigger block to be issued during the next 60° period must be of the kind which terminates at the end of the next-but-one 60° period, i.e. is to be directed to that thyristor the trigger time of which is directly related to the zero-crossover which will occur at the end of the next-but-one 60° interval. (Such a block will be referred to as a "sector 2 block").

If the next block is determined to be a sector 1 block a counter or timer (included in microcomputer 2) is loaded at the end of the current period with the difference N between the said calculation result and the content of the stack location which corresponds to the next 60° period. The counter is started when the next zero-crossover occurs so that it is then decremented by the output of the clock generator 6, and an appropriate digital "trigger word" is issued at output 14 of microcomputer 2 when its count reaches zero in order to trigger the relevant thyristor. (The manner in which the required trigger word is selected will be described below). Moreover, when the trigger word is issued the internal timer or counter is reloaded, this time with a number M corresponding to the unexpired portion of the relevant 60° period, and is again decremented by the output signal of the clock generator 6. When its count reaches zero an appropriate "zero-crossover word" is issued at output 14 to terminate the relevant trigger block. The output port 14 of microcomputer 2 incorporates a latch, i.e. each word applied thereto is maintained thereat until the next word is applied.

If the next block is determined to be a sector 2 block a similar sequence of operations occurs, the differences being that in such a case the internal timer or counter is initially loaded with the difference N between the content of the stack location which corresponds to the next 60° period and the difference between the said calculation result and the content of the stack location which corresponds to the next-but-one 60° period. When the counter content reaches zero the first time, the trigger word issued is such as to trigger that thyristor the trigger time of which is related to the zero-crossover due to occur at the end of the aforesaid next-but-one 60° period (now the next 60° period), and to allow the immediatedly preceding trigger block to continue. When the internal timer or counter content reaches zero the second time, the zero-crossover word issued is such as to allow the trigger block just started to continue and to terminate the trigger block which immediately preceded it.

If the next block is determined to be a sector 3 block a similar sequence of operations again occurs, the differences being that in such a case the internal counter is initially loaded with the difference N between the content of the stack location which corresponds to the next 60° period and the difference between said calculation result and the sum of the contents of the stack locations which correspond to the next-but-one and next-but-two 60° periods. When the counter content reaches zero the first time the trigger word issued is such as to trigger that thyristor the trigger time of which is related to the zero-crossover due to occur at the end of the aforesaid next-but-two 60° period (now the next-but-one 60° period), to allow the immediately preceding trigger block to continue, and to terminate the trigger block which immediatedly preceded that. When the counter content reaches zero the second time there is, in this case, strictly speaking no need to issue a zero-crossover word at all, but in fact one which has no effect on the control signals at output 14 may be issued for reasons of convenience and symmetry.

If a binary "1" at one of the conductors of the output 14 of microcomputer 2 corresponds to the absence of a trigger block for the corresponding thyristor, and a binary "0" thereat corresponds to the presence of such a trigger block, the words required at the output 14 for triggering the various thyristors may be, for example, as indicated in the following table:

TABLE 1

|     |        |
| --- | ------ |
| RL  | 111110 |
| YU  | 111101 |
| BL  | 111011 |
| RU  | 110111 |
| YL  | 101111 |
| BU  | 011111 |

As will be seen from FIG. 3, when the trigger angle is between 0° and 60°, pairs of thyristors are required to be turned on in the sequence YURL, YUBL, RUBL, RUYL, BUYL, BURL, and the AND functions of the relevant trigger words are stored in the memory of microcomputer 2 as a table (Table 2 following).

TABLE 2

|      |        |
| ---- | ------ |
| YURL | 111100 |
| YUBL | 111001 |
| RUBL | 110011 |
| RUYL | 100111 |
| BUYL | 001111 |
| BURL | 011110 |

In fact two such tables are stored, the other being in the reverse order, to cater for the cases when the sequence of the input phases are RBY and RYB respectively, the relevant table being chosen in accordance with which of these cases is actually present. The successive words of the relevant table are selected in a cyclic manner by means of a pointer or 60° sector counter which is in principle moved one place during each 60° period of the input three-phase supply. The word pointed to during each of the six kinds of 60° interval is in principle always the same. The word pointed to at any given time will be referred to as the "current word". The trigger and zero-crossover words prepared during each 60° period for outputting in the manner described above are, in the main, logic functions of the words in Table 2 as set out in Table 3 below. These functions are chosen in accordance with whether the trigger block is a sector 1 block, a sector 2 block or a sector 3 block.

TABLE 3

| SECTOR | ZERO-CROSSOVER WORD | TRIGGER WORD |
| --- | --- | --- |
| 1 | 111111 | Current |
| 2 | Current | Current AND current + 1 |
| 3 | Current AND current + 1 | Current + 1 AND current + 2 |

Consideration of these various words will reveal that their use results in the production of the required trigger blocks at output 14. (The zero-crossover word calculated is issued at the beginning of the next 60° period).

In fact the actual mode of operation of the arrangement 2, 3, 6, 7 of FIG. 2 is a modified version of the simple version set out above due to the fact that the microcomputer 2 is a serial device and therefore cannot carry out more than one operation at any given time. More particularly, it cannot "look" for the occurrence of a zero-crossover pulse from detector 3 at the same time as it starts to issue a zero-crossover word. (These two occurrences will be simultaneous if the input three-phase supply exhibits no variations from one 360° period to the next). This is the reason for the inclusion of the external counter 7, which in fact is the component which detects when the zero-crossovers actually occur, it being halted thereby so that the count at which it halted can be subsequently investigated by the microcomputer 2. Each zero-crossover word is issued by means of a routine in the program of the microcomputer 2, this routine being started in principle each time the internal counter reaches a count of zero for the second time (which as described above immediately resulted in the issue of the zero-crossover word). In order that the zero-crossover word issue at the required time, the aforesaid number M with which the internal counter is in principle loaded for its second count during each 60° period is reduced by a number corresponding to the time taken by the said routine before it actually issued the zero-crossover word. This routine is also employed to start the counter 7 a predetermined number of program steps before it issues the zero-crossover word (so that counter 7 should have reached a predetermined count when it is halted if the zero-crossover actually occurs when expected and coincides with the issue of the zero crossover word) and loads the aforementioned numbers M and N and the next trigger and zero-crossover words to be issued into registers for immediate use. These last operations will be referred to as "handup". Moreover it actually issues the trigger word if such issue is required while the said routine is being carried out. Of course it may be necessary to issue a trigger word during the "handup" period itself, which would be impossible as, as has already been pointed out, the microcomputer 2 is a serial device. To overcome this problem provision is made for moving the handup period back in time, i.e. to make it late compared with its standard or early time, relative to the expected occurrence of the next zero-crossover, if the required issue instant of a trigger word would otherwise coincide with the handup period. This is illustrated in the time diagram of FIG. 4.

As shown in FIG. 4 the aforesaid routine comprises four portions, the second and third of which have alternative versions which are chosen in accordance with the current situation. These portions are TIOWA, during which the external counter 7 is started at time t1 and "handup" is also carried out, portions TIOWB, TIOWC, TIOWD and TIOWE which are chosen as alternatives in accordance with whether the trigger pulse is required to be issued somewhere in the centre of the current 60° period (TIOWB), the trigger pulse is required to be issued just before the expected time of arrival t2 of the next zero-crossover pulse from detector 3 (TIOWC), the trigger pulse is required to be issued just after t2 (TIOWD), and the trigger pulse is required to be issued during the time occupied by the earliest of the two alternative positions for TIOWA shown (TIOWE). All the portions TIOWB/C/D/E issue a zero-crossover word at time t2, and the portions TIOWC and TIOWD also issue a trigger pulse at the relevant instant relative to t2. As will be seen, if the alternatives TIOWB or TIOWC are chosen the internal timer or counter reaches zero (as indicated at t4) and initiates portion TIOWA earlier than it does (at t'4) if the alternatives TIOWD or TIOWE are chosen. This is achieved by suitably modifying the number M with which it is in principle loaded for the second time during the current 60° period. The portions TIOWB and TIOWC are followed by the portion ENDOWE in which the number at which the external counter 7 has been halted is read at time t3 and the expected count (allowing for the fact that it was started relatively early in relation to the expected zero crossover instant t2) is subtracted therefrom to give the difference or error between the expected and actual arrival time of the relevant zero-crossing. Similarly the portions TIOWD and TIOWE are followed by the portion ENDOWL in which the number at which the external counter 7 has been halted is read at time t'3 and the expected count (allowing for the fact that it was started relatively late in relation to the expected zero-crossover instant t2) is subtracted therefrom to give the differences between the expected and actual arrival times of the relevant zero-crossing.

The portions ENDOWE/L are followed by a portion ENDOWT in which the internal timer or counter is started again. ENDOWT moreover adjusts the number N from which this counter starts counting in accordance with the error which has occurred, so that the instant at which it subsequently reaches zero is correctly related to the instant at which the zero crossover actually occurred. (This number has been previously adjusted in accordance with whether TIOWB/C or TIOWD/E has been chosen, so that in both cases it subsequently reaches zero at the same instant (at which the next trigger pulse will be issued unless the next routine includes the portion TIOWC or TIOWD)). If desired the portion ENDOWT may also, for the purposes of correcting the current contents of the stack location which corresponds to the relevant 60° period, "window" the error which has occurred, i.e. give it a value of plus or minus x if its actual value is greater than plus x, or less than minus x, respectively, and also produce a record for subsequent incrementing of a counter (which will be referred to as SYNCK 2) which keeps an account of the number of excessive errors which have occurred which have not been followed by the same number of non-excessive errors, if the modulus of the error is greater than x, and decrementing of this counter if the modulus is less than or equal to x. The content of this counter can be used to terminate the trigger pulses if it exceeds a predetermined value.

How the arrangement 2, 3, 6, 7 carries out the operations described above will now be described with reference to some flowcharts. The microcomputer 2 is programmed with various routines and sub-routines. One of these routines is cyclic, incorporates an internal trap or waiting loop and is carried out unless interrupted. In normal operation the external interrupt 8 of microcomputer 2 is disabled but its internal timer interrupt is enabled. It will be referred to as MAIN and is as fhown in FIG. 5; it calls a number of subroutines. Housekeeping utilises two flags registers which will be referred to as FLAGS and RECORD respectively. The various blocks in FIG. 5 have the following significances:

20=START
21=Call sub-routine A to D

22=Determine sector and set FLAGS bits 1 and 0 accordingly
23=Call subroutine SORTW and set FLAGS bits 5 and 4 accordingly
24=Call subroutine TRIGWD
25=Call subroutine SIGMA (which includes the aforesaid internal trap or waiting loop)
26=Call subroutine CHECKCHANGE The routine MAIN is cycled through only once in each 60° period of the three-phase supply (this being ensured by means of the internal trap) and, inter-alia, obtains up-to-date information as to the time-fraction of the three-phase input waveform it is currently required to utilise (determined by the output of generator 16 in FIG. 2) in terms of the current period of the input supply as expressed as a number of output pulses of clock generator 6. The subroutine SIGMA, if and only if a new error has just been calculated, (denoted by a further flag bit F1 being equal to 1) corrects the content of the relevant stack locations in accordance with that error and then sums the contents of all six stack locations to obtain a measure of the current period of the three-phase supply. It also updates the aforesaid good/bad error indicator SYNCK2. Otherwise it enters the aforesaid waiting loop until the flag bit is set to 1.

Sub-routine A and D reads the current output ADCON of generator 16 and calculates and stores the quantity $|A-D|$ where $|A-D|=(ADCON \times SIG)/614$, SIG being the latest result of the summing operation carried out by sub-routine SIGMA. It will be seen that $|A-D|$ is the number of output pulses of clock generator 6 which corresponds to the required predeterined time (see previously) as indicated by the output of generator 16 (assuming that this output has eight bits and consequently has a maximum value of 255; $614 = 150/360 \times 256$).

Block 22 determines whether the next trigger block required is of the sector 1, sector 2 or sector 3 type (see previously).

Subroutine SORTW determines which of the versions TIOWB, TIOWC, TIOWD and TIOWE of FIG. 4 is required the next time but one and adjusts the value M of the number with which the internal timer or counter of the microcomputer is to be loaded for the second time during the next 60° period accordingly, i.e. so that the selected version starts relatively early or late as required. Moreover it adjusts the value N of the number with which the internal timer or counter of the microcomputer is to be loaded for the first time during the next 60° period in accordance with whether the next TIOW routine will be early or late on the assumption that this next TIOW routine will be of the same type as has been determined for the next TIOW routine but one, so that the trigger word is issued at the correct time. (It is assumed here that the versions TIOWB or TIOWE are required; if versions TIOWC or TIOWD (with integral triggering) are required there is obviously no need to adjust M or N respectively).

Subroutine TRIGWD selects the trigger word in accordance with the rules set out above with reference to Table 2.

Subroutine CHECKCHANGE makes suitable adjustments if the next-but-one TIOW routine will in fact be of a different type to the next TIOW routine.

Figure 6:
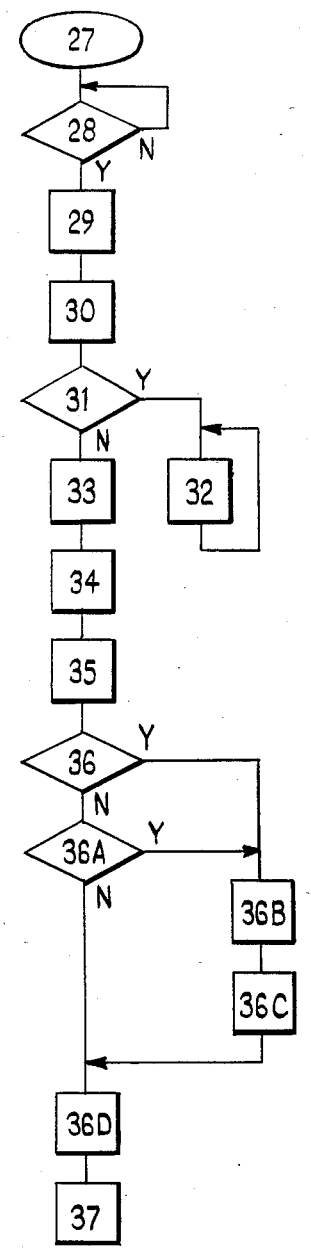

FIG. 6 is a flow chart of the sub-routine SIGMA, the various steps having the following significances:
27 - Start
28 - Has a routine TIOW just been completed and a new error calculated?(Is flag F1=1?)
29 - Clear flag F1
30 - Update good/bad indicator SYNCK2
31 - Is content of SYNCK 2 larger than allowable?
32 - Turn off trigger signals. Issue alarm.
33 - Fetch new error
34 - Add new error to content of the location at the bottom of the rotating stack and store result in same location
35 - Sum contents of the six stack locations and store result in a memory location SIG.
36 - Is bit 4 of FLAGS=1 (which signifies that the next TIOW routine will incorporate internal triggering).
36A- Is bit 7 of FLAGS=1 (which signifies that the last TIOW routine was to have incorporated TIOWD and the next one will incorporate TIOWB; see the subsequent description of the subroutine CHECKCHANGE)
36B- Set internal timer interrupt branch pointer (see subsequently) to TIOWA
36C- Reset bit 7 of FLAGS to 0
36D- Move FLAGS bits 5 and 4 to the corresponding bit locations in RECORD.
37 - RETURN FLAGS bits 4 and 5 are set during each subroutine SORTW to determine whether the second portion of the routine shown in FIG. 4 is to be TIOWB (bits 4, 5=00), TIOWC (Bits 4, 5=10), TIOWD (bits 4, 5=11) or TIOWE (bits 4,5=01) the next time but one and, when a TIOW routine is actually carried out, its type is determined by the then values of the corresponding bits in RECORD. This is the reason for operation 36D.

Figure 5:
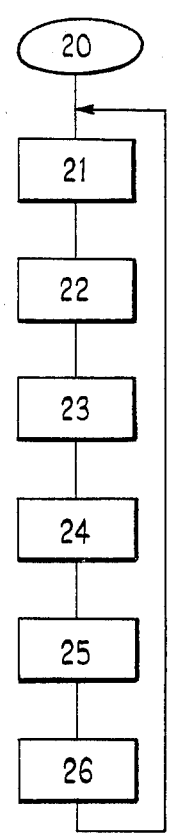
Figure 7:
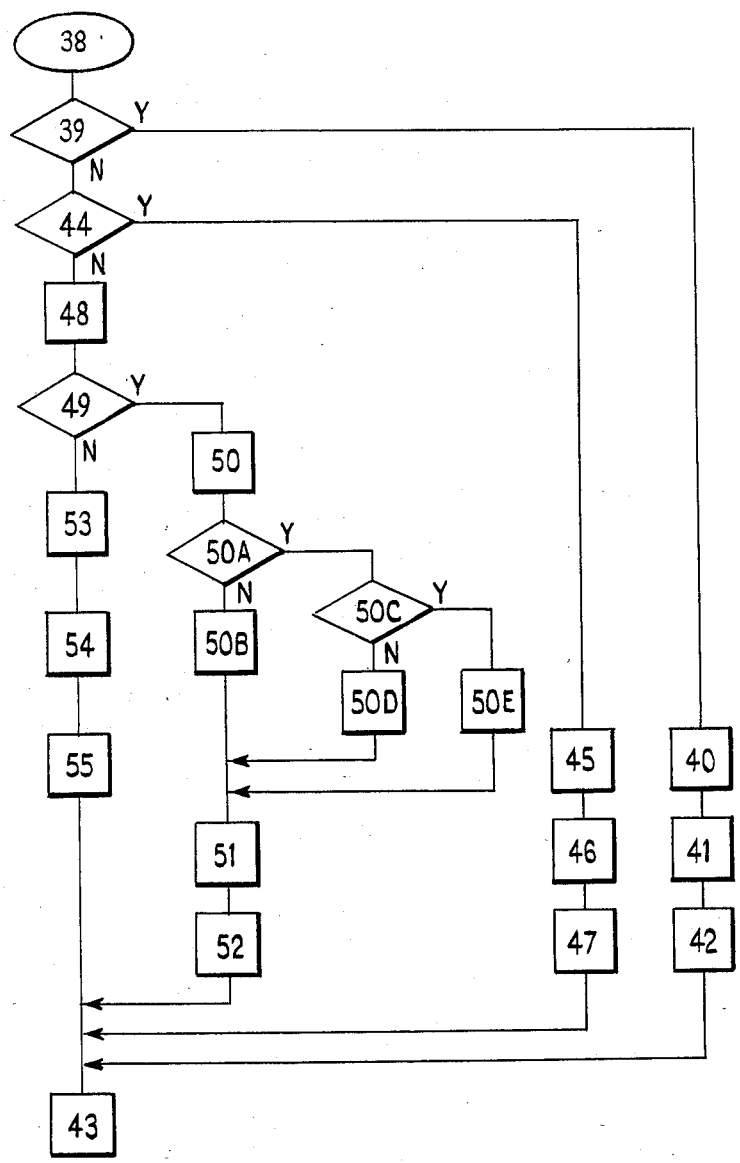

FIG. 7 is a flow chart of the sector determination block 22 of FIG. 5. In fact the relationship of this block to the SORTW subroutine block 23 is not exactly as shown in FIG. 5. Block 22 contains four alternative branches and SORTW is called at a point in whichever of these is actually followed. Moreover the sector determination block 22 also determines whether the output of generator 16 indicates zero power. This situation will be referred to as "sector 0". In FIG. 7 the various steps have the following significances:
38 - Start
39 - $|A-D|$ (see previous description of subroutine 21 of FIG. 4)=0?
40 - Store M (see previously)=0 in a register (register 4 say)
41, 46, 51, 54 - Call subroutine SORTW
42 - Set FLAGS bits 1, 0 to 00 (denoting sector 0).
43 - Return
44 - Is expected duration of next 60° period as indicated by the content of the relevant location of the rotating stack greater than $|A-D|$?
45 - (Insert $M=|A-D|$ in register 4
47 - Set FLAGS bits 1, 0 to 01 (denoting sector 1)
48 - Calculate the sum of the expected duration of the next-but-one and next-but-two 60° periods as indicated by the contents of the corresponding stack locations.
49 - Is this sum greater than $|A-D|$?
50 - Subtract the content of the stack location corresponding to the next 60° period-but-one from $|A-D|$
50A- Is the result of step 50 greater than zero?
58B- Store M=1 in register 4.

50C- Is the result of step 50 greater than the expected duration of the next 60° period as indicated by the stack?

50D- Store M=result of step 50 in register 4

50E- Store M=expected duration of the next 60° period in register 4.

52 - Set FLAGS bits 1, 0 to 10 (denoting sector 2).

53 - Insert |A-D| minus the sum determined in step 48 in register 4.

55 - Set FLAGS bits 1, 0 to 11 (denoting sector 3). (Steps 50A-50E are included to cater for the sitatuion where the expected durations of the next three 60° periods are unequal and it is required that the trigger word be issued substantially at a boundary between successive such periods).

Figure 8:
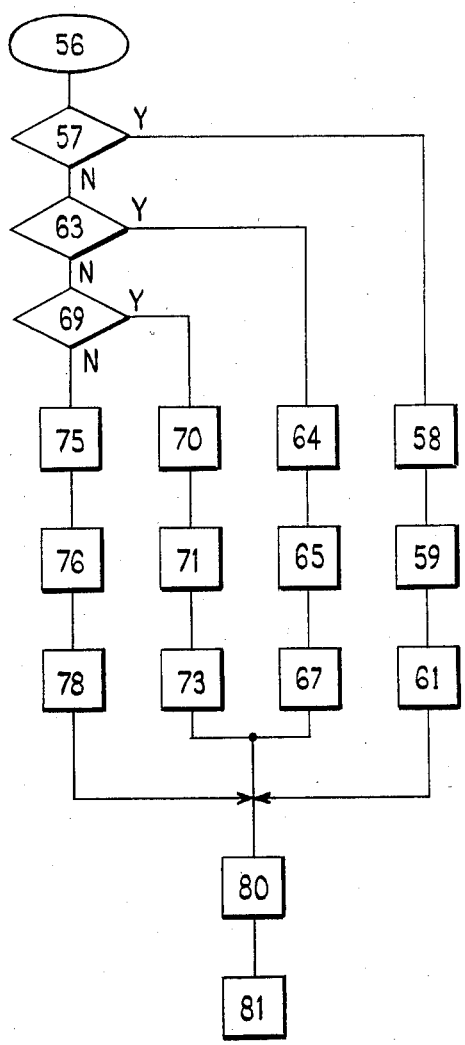

FIG. 8 is a flow-chart of the subroutine block 23 (SORTW) of FIG. 5. The various steps have the following significances:

56 - Start

57 - Is M (in register 4) less than a predetermined amount, i.e. is it required to issue the trigger word only just before the next zero-crossover word but one will be issued?

58 - Set FLAGS bits 4, 5 to 10 to signal that version TIOWC (FIG. 4) is required next time but one a zero-crossover is expected.

59 - Store a quantity 'M'=M+1 (the 1 being added so that M is never zero when version TIOWC is employed)

61 - Calculate a quantity 'N' corresponding to the expected length of the next 60° period as indicated by the stack reduced by the length of the routine version TIOWA+C from its beginning to the issue of the zero-crossover word and adjusted for the fact that the next routine TIOW is assumed to be of the same kind, i.e. relatively early.

80 - File 'M' and 'N'.

81 - Return

63 - Is the difference between the expected length of the next 60° period (indicated by the relevant location of the stack) and M less than a predetermined amount, i.e. it is required to issue the next trigger word only just after the next zero-crossover word is issued?

64 - Set FLAGS bits 4, 5 to 11 to signal that version TIOWD (FIG. 4) will probably be required next time but one a zero crossover is expected

65 - Calculate and store a quantity 'N' corresponding to the expected length of the next 60° period (indicated by the relevant location of the stack) reduced by the value of M and increased by 1.

67 - Calculate and store a quantity 'M' corresponding to the expected length of the next 60° period reduced by the length of the routine version TIOWA+D from its beginning to the issue of the zero-crossover word and adjusted for the fact that the next routine TIOW is assumed to be of the same kind, i.e. relatively late.

69 - Is M greater than a predetermined amount, i.e. is it required to issue the next trigger word at a time in the next 60° period before the TIOWA routine portion (handup) is started?

70 - Set FLAGS bits 4, 5 to 00 to signal that version TIOWB (FIG. 4) is required next time but one a zero-crossover is expected.

71 - Calculate and store quantity 'M' as M adjusted for the fact that the next but one TIOW routine is required to be relatively early.

73 - Subtract M from the expected length of the next 60° period to give N. Adjust N for the fact that the next TIOW routine is assumed to be of the same kind, i.e. relatively early, to give a result 'N'. Store 'N'.

75 - Set FLAGS bits 4, 5 to 0, 1 to signal that version TIOWE is required next time but one. (The trigger word would otherwise have to be issued during TIOWA).

76 - Calculate and store quantity 'M' as M adjusted for the fact that the next but one TIOW routine is required to be relatively late.

78 - Subtract M from the expected length of the next 60° period to give N. Adjust N for the fact that the next TIOW routine is assumed to be of the same kind, i.e. relatively early, to give a result 'N'. Store 'N'.

FIG. 9 is a flow chart of the operations constituting the subroutine 24 (TRIGWD) of FIG. 5, for an understanding of which reference is also made to the description above with reference to Table 2 et seq. The various operations in FIG. 9 have the following significance:

82 - Start

98 - Complement further flag F1

83 - FLAGS bits 1, 0=00? (Zero power, i.e. no trigger required?)

84 - Clear trigger word and zero-crossover word immediate storage locations.

85 - Set timer interrupt branch pointer to TIOWA (see subsequently).

86 - Set further flag F1=0.

97 - Return

87 - Does phase rotation flag correspond to RBY? (see subsequently)

88 - Fetch RBY trigger word table

91 - Fetch RYB trigger word table

89 - Get sector counter (see subsequently) and calculate current trigger word pointer

90 - FLAGS bits 4, 5=10? (TIOWC type interrupt specified in FLAGS?)

91 - Decrement current trigger word pointer

92 - Fetch trigger word pointed to from table and store

94 - FLAGS bits 1, 0=0 1? (sector 1?)

95 - Clear zero-crossover word immediate storage location.

96 - Store trigger word fetched in step 92 in trigger word immediate storage location.

99 - FLAGS bits 1, 0=1 0? (Sector 2?)

100 - Store trigger word fetched in step 92 in the zero-crossover word immediate storage location.

101 - Increment current trigger word pointer, fetch trigger word pointed to from table, AND it with the trigger word fetched in step 92, and store it in the trigger word immediate storage location.

104 - Increment current trigger word pointer, fetch trigger word pointed to from table, store it, AND it with the trigger word fetched in step 92, and store the result in the zero-crossover word immediate storage location.

105 - Increment current trigger word pointer, fetch and AND the trigger word pointed to with the trigger word fetched in step 104, and store result in the trigger word immediate storage location.

102 - FLAGS bits 4, 5=10? (TIOWC-type routine specified in FLAGS?).

103 - Set further flag F1=0.

106 - Return.

107 - Further flag F1=0?
700 - Save word present in trigger word immediate storage location.
701 - Increment sector counter.
703 - Decrement sector counter.
704 - Restore word saved in step 700 to the trigger word immediate storage location.
705 - Return A large amount of the routine TRIGWD of FIG. 9 is rendered necessary by the fact that, when a routine of the TIOWC type (FIG. 4) is carried out, the trigger word handed up is outputted before the zero-crossover handed up is outputted. This makes it necessary to modify the zero-crossover word in sector 2 and sector 3 situations. Moreover, the trigger word should be such as to correspond to the current 60° period of the input waveform, not to the next such period as is the case when routines of types TIOWB, TIOWD and TIOWE are employed; hence step 91.

FIG. 10 is a flow-chart of the operations constituting the subroutine 26 (CHECKCHANGE) of FIG. 5. As will be seen from the description of FIG. 8, the quantities 'M' and 'N' are calculated during each 60° period on the assumption that the next routine TIOW to be carried out is of the same type as the next-but-one routine TIOW to be carried out. Obviously this is not necessarily the case, for example if the output of generator 16 is in the process of being varied. In fact, other problems would also occur at certain transitions from one type of TIOW routine to another unless steps were taken to overcome them. For example, if the next TIOW routine (specified in RECORD) were type C and the next-but-one TIOW routine (specified in FLAGS) were type D the implication of the type D in FLAGS is that the trigger pulse in the next 60° period should come very shortly after the initiating zero-crossover word is issued, which, by its very nature, a type C routine is unable to achieve. The type C routine in RECORD in such a case cannot be simply replaced by type D, because the former is of the "early" type whereas the latter is of the "late" type and the system is already committed to initiating a routine of the "early" type. A solution to this particular problem is to replace the type C specified in RECORD by type B, and arrange that the trigger word is outputted at the zero-crossover instant therein (the zero-crossover word which has to be replaced for issue at the zero-crossover instant being discarded). In this particular case the value of 'N', which has been calculated on the assumption that it initiates a trigger word output in a D-type routine after the trigger word has been issued, will have to be adjusted on the basis that it actually has to initiate a type D routine after a type B routine. The purpose of the subroutine CHECKCHANGE symbolized by block 26 of FIG. 5 is to determine whether a change is about to occur in the type of TIOW routine being issued, i.e. to determine whether the TIOW routine specified in FLAGS differs from that specified in RECORD and, if it does, carry out appropriate modifications of the kind exemplified above. It is assumed that only a slow change (if any) will occur in practice in the output of generator 16, and that any asymmetry in the input three-phase waveform is not too excessive, so that changes in the type of TIOW subroutines calculated by the subroutine 24 (SORTW) always occur in the cyclic order TIOWB-TIOWE-TIOWC-TIOWD-TIOWB-etc. or its reverse. The significances of the various steps in FIG. 10 are as follows.

399 - Start
400 - Are bits 5 and 4 of FLAGS identical to bits 5 and 4 respectively of RECORD?
401 - Return
402 - Are bits 5 and 4 of RECORD and bits 5 and 4 of FLAGS equal to 10 and 11 respectively (signifying a change from TIOW subroutine type C to TIOW subroutine type D)?
403 - Change bit 5 of RECORD to 0 (type B).
404 - Adjust 'N' for the fact that it was calculated on the basis that it is required to initiate a trigger pulse within a TIOW subroutine of the D type whereas in fact it is required to initiate a ("late") type D subroutine after an (early) type B subroutine.
405 - Replace the zero-crossover word in the zero-crossover word immediate storage location referred to in the description of FIG. 9 by the content of the trigger word immediate storage location also referred to.
406 - Return.
407 - Are bits 5 and 4 of RECORD and bits 5 and 4 of FLAGS equal to 00 and 11 respectively (signifying a change from TIOWB and TIOWD)?
408 - As 404
409 - As 405
410 - Return
411 - Are bits 5 and 4 of RECORD and bits 5 and 4 of FLAGS equal to 01 and 10 respectively (signifying a change from TIOWE to TIOWC)?
412 - Adjust 'N' for the fact that it was calculated on the basis that it is required to initiate an (early) type subroutine after another (early) type C subroutine, whereas in fact it is required to initiate a type C subroutine after a (late) type E subroutine.
413 - Return.
414 - Are bits 5 and 4 of RECORD and bits 5 and 4 of FLAGS equal to 11 and 10 respectively (signifying a change from TIOWD to TIOWC)?
415 - Change bit 5 of RECORD to 0 (type E).
416 - As 412.
417 - As 405.
418 - Return.
419 - Are bits 5 and 4 of RECORD and bits 5 and 4 of FLAGS equal to 10 and 01 respectively (signifying a change from TIOWC to TIOWE).
420 - As 403.
421 - Adjust 'N' for the fact that it was calculated on the basis that it is required to issue a trigger word after a (late) type E subroutine whereas in fact it is required to issue such a word after an (early) type B subroutine.
422 - Return.
423 - Are bits 5 and 4 of RECORD and bits 5 and 4 of FLAGS equal to 00 and 01 respectively (signifying a change from TIOWB to TIOWE)?
424 - As 421
425 - Return.
426 - Are bits 5 and 4 of RECORD and bits 5 and 4 of FLAGS equal to 01 and 00 respectively (signifying a change from TIOWE to TIOWB)?
427 - Adjust 'N' for the fact that it was calculated on the basis that it is required to issue a trigger word after an (early) type B subroutine whereas in fact it is required to issue a trigger word after a (late) type E subroutine.
428 - Return.

429 - Are bits 5 and 4 of RECORD and bits 5 and 4 of FLAGS equal to 11 and 00 respectively (signifying a change fromm TIOWD to TIOWB)?

430 - As 415.

431 - Recalculate 'N' (Using the expected length of the next 60° period) on the basis that it is now required to initiate an (early) type B subroutine after a (late) type E subroutine.

432 - Set bit 7 of FLAGS to 1 to indicate that a type D to type B transition is taking place.

433 - As 405.

434 - Return.

435 - Return.

As mentioned above, the routine MAIN of FIG. 5 (including its waiting loop or internal trap) is cycled through in normal operation except when it is interrupted by means of an internal timer interrupt. A first kind of these interrupts initiates one of the TIOW routines of FIG. 4 and results in the outputting of at least a zero-crossover word and possibly also a trigger word (if versions TIOWC or TIOWD are selected). This kind of interrupt is pointed to by the pointer TIOWA mentioned above. A second kind of these interrupts (pointed to by the pointer TITR mentioned above) outputs a trigger word when such outputting is required between two successive routines TIOW. Such a second kind of timer interrupt, when it occurs, merely gets the required trigger word from the immediate storage location where it has been stored in the subroutine TRIGWD (FIG. 9) of MAIN, and outputs it, fetches the quantity 'M' from the immediate storage location where it has been stored by the subroutine SORTW (FIG. 8), sets the internal timer or counter accordingly, starts the internal counter, and sets the timer interrupt branch pointer to TIOWA, after which MAIN restarts.

Flow charts of the routine carried out in response to a timer interrupt pointed to by the pointer TIOWA are shown in FIGS. 11 and 12. The significances of the various step in FIG. 11 are as follows:

108 - Start

109 - Clear and start external counter 7 (FIG. 2)

110 - Fetch 'M', 'N', the next zero-crossover word and the next trigger word from the corresponding immediate storage locations in which they have been stored by subroutines SORTW and TRIGWD of MAIN (handup)

111 - Fetch next timer interrupt branch pointer and store

112 - Update sector counter (The above steps constitute TIOWA in FIG. 4)

113 - RECORD bit 5=1? (TIOWD or E required?)

114 - RECORD bit 4=1? (Is it TIOWD or TIOWE which is required?)

115 = Output zero-crossover word handed up

116 = Wait fixed time (Steps 115 and 116 constitute TIOWE in FIG. 4)

120 = Output zero-crossover word handed up

121 = Wait for time determined by the value of 'N' handed up

122 = Output trigger word handed up

123 = Wait for time determined by the difference between the time already elapsed in TIOWD and the total duration of TIOWD (Steps 120–123) constitute TIOWD in FIG. 4)

124 = RECORD bit 4=1? (Is it TIOWB or C which is required?)

125 = Calculate from 'M' and the duration of TIOWC up till the zero-crossover word is outputted the time till it is required that the trigger word is outputted 126 = Wait the calculated time 127 = Output the trigger word handed up 128 = Wait time determined by the value of 'M' handed up 129 = Output the zero-crossover word handed up 130 = Wait a fixed time (to obtain a match with the duration of TIOWB)

(Steps 125–130 constitute TIOWC in FIG. 4)

133 = Wait a fixed time

134 = Output the zero-crossover word handed up

135 = Wait a fixed time (Steps 133–135 constitute TIOWB in FIG. 4)

117, 131 = Read external counter 7

132 = Add a number to the result such that zero will be obtained if the zero-crossover occurred when expected taking into account the early nature of TIOWB/C.

(Steps 131–132 constitute ENDOWE in FIG. 4)

118 = Add a number to the result obtained in step 117 such that zero will be obtained if the zero-crossover occurred when expected taking into account the late nature of TIOWD/E (Steps 117–118 constitute ENDOWL in FIG. 4).

119 = ENDOWT in FIG. 4 (See FIG. 12)

FIG. 12 shows the various steps of ENDOWT, these being:

136 = Store error calculated in step 132 or 118

137 = Error negative?

138 = Error less then (maximum window) value −x? (See previously)

138 = Store −x for subsequent use in step 33 of SIGMA (FIG. 6)

140 = Store +1 for subsequent use in step 30 of SIGMA

141 = Error greater than (maximum window) value +x?

142 = Store +x for subsequent use in step 33 of SIGMA (FIG. 6)

143 = As 140

144 = Store −1 for subsequent use in step 30 of Sigma

145 = Adjust 'N' in accordance with error stored in step 136 and load internal timer with the result, (to compensats its subsequent counting period for the fact that an error has occurred)

146 - Set flag F1=1 (so that SIGMA routine will be carried out on return from interrupt)

147 - Set timer interrupt pointer to TITR

148 - Return.

The above description relates to the steady state when the arrangement 2, 3, 6, 7 is issuing trigger pulses. When initially switched on an initialization process has to be carried out in which the ports, counters, flags etc have to be set to the required initial values, and the six locations of the rotating stack have to be loaded with values which correspond to the lengths of the 60° periods of the three-phase supply. If desired, tests can also be carried out during this routine to determine whether the frequency of the three-phase supply lies within a range which can be accommodated by the arrangement. The crossover detector 3 of FIG. 2 is in fact switchable, by applying a control signal to its input 19, between a first state in which it produces a pulse at its output 5 each time a crossover occurs in the phase voltages of the input three-phase supply (i.e. as assumed above) and a second state in which it produces a pulse at its output 5 only once every 360° period of the supply, i.e. when a particular kind of crossover occurs in the phase voltages. Moreover it produces at its output 152 a signal indicative of whether the phase waveforms occur in the supply in the order RBY or RYB. (Reference is again made to U.S. Pat. No. 4,495,461 for a possible construction for detector 3). The rotating stack is loaded with suitable initial values by setting detector 3 to its second state and measuring one 360° period, i.e. the period between two successive output pulses from detector 3, in terms of the number of output pulses produced by generator 6 during this period. This is done by a part of the initialization routine which is cyclic, is initiated by an output pulse from generator 3, is terminated by the next output pulse from generator 3, and which increments a register or period counter once per cycle. The length of the cycle is chosen so that the final count of the period counter is suitable for immediate loading in each location of the stack, i.e. does not require scaling. Of course, the resulting content of the stack takes no account of possible inequalities between the various nominally 60° periods of the supply, so the stack contents are then corrected one or more times in the manner described previously (in subroutine SIGMA) before trigger blocks are issued.

A flow chart of the initialization routine with which the microcomputer 2 of FIG. 2 is programmed is shown in FIG. 13, in which the various steps have the following significances:

149 Start (This is the start of the complete programme)
150 Initialize ports (including setting detector 3 to produce one pulse every 360° period), SYNCK 2 counter, 60° sector counter, FLAGS (to inter alia specify TIOWA+B at the first internal timer interrupt), set further flag F1=1 and set trigger words to 111111 in the aforementioned immediate registers
151 Wait for external interrupt input 8 to go high, i.e. for first pulse from generator 3,
154 Increment the above-mentioned period counter
155 Is the content of the period counter greater than a predetermined amount? (If the frequency of the three-phase supply too low?)
156 Signal alarm
157 Has the external interrupt input 8 gone high for a second time? (Has the generator 3 produced a second pulse?)
158 Pause for a predetermined time to make the cycle length 154-155-157-158-154 the desired value (see above)
159 Disable external interrupt input 8
160 Insert content of period counter into all six stack locations
161 Calculate expected time (in terms of output pulses from clock 6) till next 60° crossover from the content of the period counter and the time which has elapsed since the last output pulse from generator 3, subtract from it (t2-t4) (see FIG. 4) and load the internal timer of the microcomputer 2 with the result
162 Switch detector 3 to produce one pulse at every crossover (input 152)
163 Enable internal timer/counter interrupt
164 Is the content of the period counter less than a predetermined amount? (Is the frequency of the three-phase supply too high?)
165 Signal alarm
166 Set internal timer interrupt to TIOWA branch
167 Has 60° sector counter reached a count of six?
168 Subtract (t2-t4) (see FIG. 4) in terms of output pulses from clock generator 6 from the content of the period counter, adjust result for the fact that the TIOWA+B routine (which is about to be called when the internal timer reaches zero) is of the "early" type (c.f. the description of FIG. 8) and file the result 'N' in a register for immediate use.
169 Wait until return from next timer interrupt
170 Call subroutine SIGMA (FIG. 6)
171 Is phase rotation RBY? (input 153)
172 Set phase rotation bit (bit 2 of FLAGS) to RYB
173 Set phase rotation bit to RYB
174 Jump to Start of MAIN (Block 20 in FIG. 5)

The driver circuits 15 of FIG. 2 may each comprise a transistor the base of which is driven by the relevant output 14 and the collector circuit of which includes the primary of a transformer, the secondary of the transformer being connected between the cathode and the gate of the relevant thyristor. If desired an individual NAND gate may be included between each output 14 and the base of the relevant transistor, a second input of this NAND gate being driven by the output of a clock pulse generator so that each trigger block is chopped at a high frequency prior to its application to the relevant transistor.

It will be appreciated that the control signal generator described may be modified in various ways. For example, the "windowing" operation carried out in steps 137–144 of FIG. 12 may be omitted, with the consequent omission of step 30–32 of FIG. 6. In such a case the error fetched in step 33 of FIG. 6 will have to be that stored in step 136 of FIG. 12. As another example the arrangement may be programmed to issue mere trigger pulses (coinciding with the start of each trigger block described) rather than complete trigger or control signal blocks, in which case considerable simplification of the program and omission of counter 7 of FIG. 2 is in fact possible, although in such a case the program described may be merely modified by omitting steps 95, 100 and 104 of FIG. 9 and steps 115, 120, 129 and 134 of FIG. 11 and inserting a step "output 111111" immediately after the trigger word is outputted in each internal timer interrupt of the second kind (pointed to by the pointer TITR), immediately after step 122 in FIG. 11, and immediately after step 127 in FIG. 11.

The generator arrangement described with reference to FIGS. 2–13 generates control signals which are suitable for semiconductor switches included in a fully controlled a.c. bridge. (It is assumed that the load 1 of FIG. 2 is star-connected). Obviously other forms of bridge are possible, for example a half-controlled a.c. bridge (in which the thyristors RL, YL and BL of FIG. 2 are replaced by simple diodes), fully and half-controlled d.c. bridges, and so-called "split-delta" a.c. bridges. Some of these alternatives require trigger blocks different to those illustrated in FIG. 3, which can obviously be generated by suitably altering the program described. For example, the first block in each of the pairs of blocks which relate to the same thyristor shown in FIG. 3 for time-fractions up to 2/5 will have to be omitted when a half-controlled a.c. bridge is controlled, the starts of the second block in each pair then simply advancing to 210° as the fraction is increased from 0 to 1. Moreover, in this case the trigger blocks relating to the thyristors RL, YL and BL obviously become redundant.

I claim:

1. A control signal generator arrangement for semiconductor switches for controlling power delivered to a load from an alternating current power supply source comprising inputs for connection to respective conductors of the A.C. power, a further input for receiving a signal at least nominally indicative of the time-fraction of each period of the total available supply waveform it is required be utilised for delivering power to the load, and outputs for feeding control inputs of said switches, means for detecting zero-crossing instants of the voltages between a pair or pairs of said conductors and generating control signals at said outputs so that each control signal is generated a predetermined period of time before a zero-crossing instant is expected to occur on the basis of the time at which a zero-crossing instant has already occurred, said predetermined period of time being proportional to the time-fraction currently indicated by a signal at the further input, a constant one-to-one relationship existing between the particular output at which each control signal is generated and the particular type of zero-crossing instant of each period of the supply with respect to the expected instant of occurrence of which the corresponding predetermined period of time is measured, and means for producing respective signals representative of the individual intervals elapsing between successively detected zero-crossing instants and for generating each of the control signals the predetermined period of time before the corresponding zero-crossing instant is expected to occur on the basis of the time at which a zero-crossing instant has already occurred and the time which elapsed between the instants at which the zero-crossings of the same respective types occurred in the preceding period of the supply as represented by the corresponding signal or signals produced.

2. An arrangement as claimed in claim 1, further comprising means for maintaining a running record of all those said signals representative of the intervals elapsing between successively detected zero-crossing instants which relate to a complete period of the supply and which have been most recently produced.

3. An arrangement as claimed in claim 2, including means for repeatedly summing the current content of the record and making said predetermined period of time also proportional to the current sum.

4. An arrangement as claimed in claim 3, wherein said alternating current power supply source is a three-phase alternating current power sypply source, said arrangement having first, second and third said inputs for connection to respective conductors of the A.C. supply, a fourth input which constitutes said further input, and first, second, third, fourth, fifth and sixth said outputs, said arrangement comprising means for detecting each zero-crossing instant of the voltages between respective pairs of said first, second and third inputs, for generating said control signals at said outputs in cyclic succession in such manner that one is generated said predetermined period of time before each said zero-crossing instant is expected to occur, for generating, when said time-fraction is less than 2/5, additional control signals at said outputs in such cyclic succession in such manner that each such additional control signal is generated at the relevant output at an instant which coincides with the appearance of one of the first-mentioned control signals at the output which lies one place subsequently in said cyclic succession, for producing signals representative of the lengths of the intervals elapsing between successive said zero-crossing instants, and for maintaining in said running record the six such signals most recently produced.

5. An arrangement as claimed in claim 4 including means for determining said predetermined period of time as the product of the sum of the intervals represented by the six signals currently in the record, the time-fraction currently indicated by a signal at the fourth input, and a factor of 5/12.

6. A modification of an arrangement as claimed in claim 4, wherein each said signal representative of the length of the interval elapsing between successive said zero-crossing instants is replaced by a singal representative of an increased or decreased version of the length, as indicated by the previous content of the record, of the interval which elapsed between the corresponding zero-crossing instants in the preceding period of the three-phase supply if the first-mentioned length should be respectively larger or smaller by a predetermined amount than the second-mentioned length, the increase or decrease being equal to said predetermined amount.

7. A modification as claimed in claim 6, including means for maintaining a count of the number of times such replacement has occurred reduced by the number of times such replacement has subsequently not occurred, and for terminating the generation of the control signals at said outputs if said count exceeds a predetermined amount.

8. An arrangement as claimed in claim 4 characterized in that it includes means for maintaining, when said time-fraction currently indicated by a signal at the fourth input is less than 2/5, each of the first-mentioned control signals at the corresponding output until the current predetermined period of time has elapsed and for maintaining each of the additional control signals at the corresponding output while that one of the first-mentioned control signals which appears at the output which lies one place subsequently in said cyclic succession is maintained thereat, for maintaining, when said time-fraction currently indicated by a signal at the fourth input lies in the range 2/5 to 4/5, each of the first-mentioned control signals at the corresponding output until the current predetermined period of time, increased by the period of time which is expected to occur between the corresponding zero-crossing instant and the zero-crossing instant which will immediately succeed it as indicated by the current content of the record, has elapsed, and for maintaining, when said time-fraction currently indicated by a signal at the fourth input is greater than 4/5, each of the first-mentioned control signals at the corresponding output until the current predetermined period of time, increased by the period of time which is expected to occur between the corresponding zero-crossing instant and the zero-crossing instant which will immediately succeed it as indicated by the current content of the record and reduced by the product of the sum of the intervals represented by the six signals currently in the record, the amount by which said time-fraction excceds 4/5, and a factor of 5/12, has elapsed.

9. An arrangement as claimed in claim 8, comprising a zero-crossing detector having said first, second and third inputs, a counter having a "stop" input to which an output of said detector is connected, a programmed digital signal processing system having said fourth input, said first, second, third, fourth, fifth and sixth outputs, a seventh output coupled to a "start" input of said counter, and a further input to which the "count" output of said counter is coupled, and a clock signal generator for feeding clock signals to said digital signal processing system and to said counter, said detector being constructed to generate a pulse at its said output at each zero-crossing instant of the voltages between respective pairs of said first, second and third inputs and thereby stop said counter, said digital signal processing system being programmed to maintain said record to start said counter a given time before each zero-crossing instant is expected to occur on the basis of the current content of the record and the instant at which the immediately preceding zero-crossing instant actually occurred, to read the count in said counter after each instant at which a zero-crossing is expected to occur to thereby determine the time relationship between the expected zero-crossing instant and the actual zero-crossing instant, to successively update the contents of the record in accordance with the corresponding relationships so determined, and to generate and terminate said control signals at said first, second, third, fourth, fifth and sixth outputs on the basis of the current content of the record, the instants at which the zero-crossovers actually occur, and the time fraction currently indicated by a signal at the fourth input.

10. An arrangement as claimed in Claim 9, characterized in that said detector is switchable to a second state in which it generates a pulse only when each zero-crossing instant of a specific kind occurs between the voltages at said first, second and third inputs, in that the output of said detector is coupled to a second further input of said digital signal processing system, and in that said ditital signal processing system is programmed to initially switch said detector to its second stat, to then measure the period of time elapsing betwen successive output pulses of said detector, to load each part of the record with a signal representative of one sixth of the period so measured, and to subsequently switch said detector to its other state, commence updating of the record, and commence generation of said control signals.

11. An arrangement as claimed in claim 2, wherein said alternating current power supply source is a three-phase alternating current power supply source, said arrangement having first, second and third said inputs for connection to respective conductors of the A.C. supply, a fourth input which constitutes said further input, and first, second, third, fourth, fifth and sixth said outputs, said arrangement comprising means for detecting each zero-crossing instant of the voltages between respective pairs of said first, second and third inputs, for generating said control signals at said outputs in cyclic succession is such manner that one is generated said predetermined period of time before each said zero-crossing instant is expectd to occur, for generating, when said time-fraction is less than 2/5, additional control signals at said outputs in said cyclic succession in such manner that each such additional control signal is generated at the relevant output at an instant which coincides with the appearance of one of the first-mentioned control signals at the output which lies one place subsequently insaid cyclic succession, for producing signals representative of the lengths of the intervals elapsing between successive said zero-crossing instants, and for maintaining in said running record the six such signals most recently produced.

12. A modification of the arrangement as claimed in claim 2 wherein each said signal representative of the interval length elapsing between successive said zero-crossing instants is replaced by a signal representative of an increased or decreased version of the interval length, as indicated by the previous content of the record, of the interval length which elapsed between the corresponding zero-crossing instants in the preceding period of the three-phase supply if the first-mentioned interval length should be larger or smaller by a predetermined amount than the second-mentioned interval length, the increase or decrease being equal to said predetermined amount.

13. A control signal generator for controlling power to a load from a three phase A.C. power supply via controlled semiconductor switches comprising: a programmed microcomputer having a plurality of output terminals for connection to respective control electrodes of the semiconductor switches to apply control signals thereto that adjust the conduction angles of the respective semiconductor switches, means for applying to a control input of the microcomputer a digital signal for determining the conduction angles of the semiconductor switches, a zero crossover detector having input means to be coupled to the three phase A.C. supply and an output coupled to a further input of the microcomputer and to a "stop" input of a counter, a clock pulse generator having first and second outputs for supplying clock pulse signals to a clock input of the microcomputer and to a count input of the counter, respectively, means coupling a count signal output of the counter to another input of the microcomputer, said microcomputer including means for repeatedly measuring the actual length of each nominally 60° portion of a complete period of the A.C. supply by starting the counter at a predetermined point within each said portion, the counter subsequently being stopped by the output of the zero crossover dectector at the next zero crossover point, the microcomputer including means for reading-out the contents of the counter when the counter is stopped, the microcomputer further comprising means for deriving a running record of the six results most recently obtained and for generating the control signals, under control of said digital signal at its control input, at a predetermined time prior to the instant at which each subsequent zero crossover is expected to occur on the basis of when a zero crossover has already occurred and the current content of the record.

* * * * *